US011520853B2

(12) United States Patent
Nair et al.

(10) Patent No.: US 11,520,853 B2
(45) Date of Patent: Dec. 6, 2022

(54) MAPPING CONVOLUTION TO A PARTITION CHANNEL CONVOLUTION ENGINE

(71) Applicant: Meta Platforms, Inc., Menlo Park, CA (US)

(72) Inventors: Krishnakumar Narayanan Nair, Newark, CA (US); Rakesh Komuravelli, Fremont, CA (US); Abdulkadir Utku Diril, Menlo Park, CA (US); Ehsan Khish Ardestani Zadeh, San Jose, CA (US); Yuchen Hao, Fremont, CA (US); Martin Schatz, Seattle, WA (US); Thomas Mark Ulrich, Mountain View, CA (US); Olivia Wu, Los Altos, CA (US); Anup Ramesh Kadkol, Sunnyvale, CA (US); Amin Firoozshahian, Mountain View, CA (US)

(73) Assignee: Meta Platforms, Inc., Menlo Park, CA (US)

(*) Notice: Subject to any disclaimer, the term of this patent is extended or adjusted under 35 U.S.C. 154(b) by 226 days.

(21) Appl. No.: 16/805,339

(22) Filed: Feb. 28, 2020

(65) Prior Publication Data

US 2021/0271451 A1    Sep. 2, 2021

(51) Int. Cl.
*G06F 17/15*    (2006.01)
*G06F 7/544*    (2006.01)
(Continued)

(52) U.S. Cl.
CPC .......... *G06F 17/153* (2013.01); *G06F 7/5443* (2013.01); *G06F 17/16* (2013.01); *G06N 20/00* (2019.01)

(58) Field of Classification Search
CPC ...... G06F 17/153; G06F 17/16; G06F 7/5443; G06F 7/483; G06N 20/00
See application file for complete search history.

(56) References Cited

U.S. PATENT DOCUMENTS 11,157,441 B2 * 10/2021 Talpes ................. G06F 15/8023
2009/0077449 A1 * 3/2009 Lee ...................... H03M 13/611
                                                                714/785
(Continued)

FOREIGN PATENT DOCUMENTS

EP          3480745          5/2019

OTHER PUBLICATIONS docs.gimp.org, Section 9.2, Convolution Matrix (Year: 2017).*
(Continued)

*Primary Examiner* — Matthew D Sandifer
(74) *Attorney, Agent, or Firm* — Van Pelt, Yi & James LLP

(57) ABSTRACT

A processor system comprises two groups of registers and a hardware channel convolution processor unit. The first group of registers is configured to store data elements of channels of a portion of a convolution data matrix. Each register stores at least one data element from each channel. The second group of registers is configured to store data elements of convolution weight matrices including a separate matrix for each channel. Each register stores at least one data element from each matrix. The hardware channel convolution processor unit is configured to multiply each data element in a first and second portion of the first group of registers with a corresponding data element in the second group of registers to determine corresponding multiplication results and sum together the multiplication results for each specific channel to determine two corresponding channel convolution result data elements in a corresponding channel convolution result matrix.

20 Claims, 24 Drawing Sheets

(51) Int. Cl.
*G06F 17/16* (2006.01)
*G06N 20/00* (2019.01)

(56) References Cited

U.S. PATENT DOCUMENTS

| | | | |
|---|---|---|---|
| 2019/0026078 A1 | 1/2019 | Bannon et al. | |
| 2019/0026249 A1 | 1/2019 | Talpes et al. | |
| 2019/0164037 A1 | 5/2019 | Kim et al. | |
| 2019/0220043 A1* | 7/2019 | Zamora Esquivel | G05D 1/0011 |
| 2019/0325296 A1* | 10/2019 | Fowers | G06F 15/8053 |
| 2019/0370692 A1* | 12/2019 | Cho | G06N 3/0454 |
| 2020/0218978 A1* | 7/2020 | Kopinsky | G06F 17/16 |
| 2020/0401531 A1* | 12/2020 | Saeed | G06F 3/061 |
| 2020/0410337 A1* | 12/2020 | Huang | G06N 3/04 |
| 2021/0097375 A1* | 4/2021 | Huynh | G06F 9/5027 |
| 2021/0124560 A1* | 4/2021 | Liu | G06F 7/5277 |

OTHER PUBLICATIONS

Extended European Search Report for European Application No. 21150654.8, dated Jan. 25, 2022, 7 pages.
Song L., et al., "C-Brain: A Deep Learning Accelerator that Tames the Diversity of CNNs through Adaptive Data-level Parallelization," Proceedings of the 53rd Annual Designautomation Conference on, DAC '16, ACMPRESS, New York, USA, Jun. 5, 2016, 6 pages.

\* cited by examiner

MAPPING CONVOLUTION TO A PARTITION CHANNEL CONVOLUTION ENGINE

BACKGROUND OF THE INVENTION

A whole class of complex artificial intelligence problems can be solved using neural networks. Since these problems are often computationally and data intensive, hardware solutions are often beneficial for improving the performance of neural networks. The solutions to artificial intelligence problems can often be more quickly solved using hardware-based solutions that optimize the performance of convolution operations and in particular depthwise convolution operations. Traditional optimization approaches for depthwise convolution require specialized hardware and complex memory organization schemes. It is a technical challenge to create a hardware platform compatible with solving different matrix operations while also significantly improving the performance and efficiency for solving convolution operations. Therefore, there exists a need for a hardware and data path solution that improves on the ability to efficiently compute convolution operations needed for solving complex artificial intelligence problems without introducing significant complexity and restrictions.

BRIEF DESCRIPTION OF THE DRAWINGS

Various embodiments of the invention are disclosed in the following detailed description and the accompanying drawings.

FIG. 9 is a diagram illustrating an example weight matrix for performing a channel convolution operation.

Figure 10B:
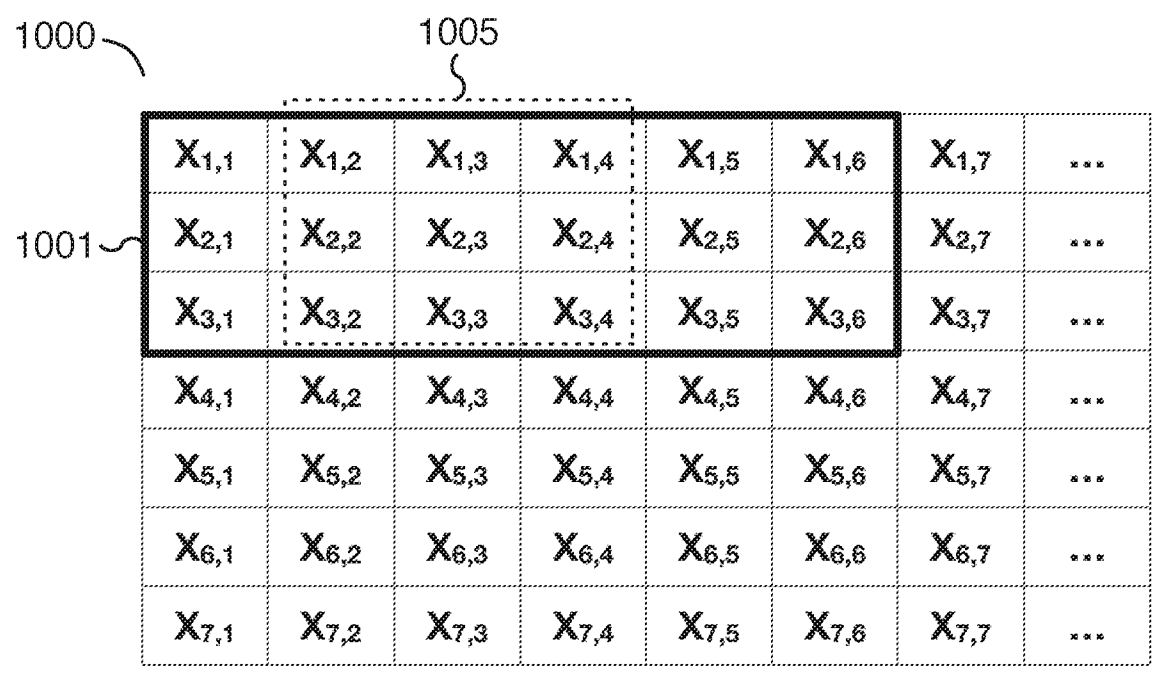
Figure 10D:
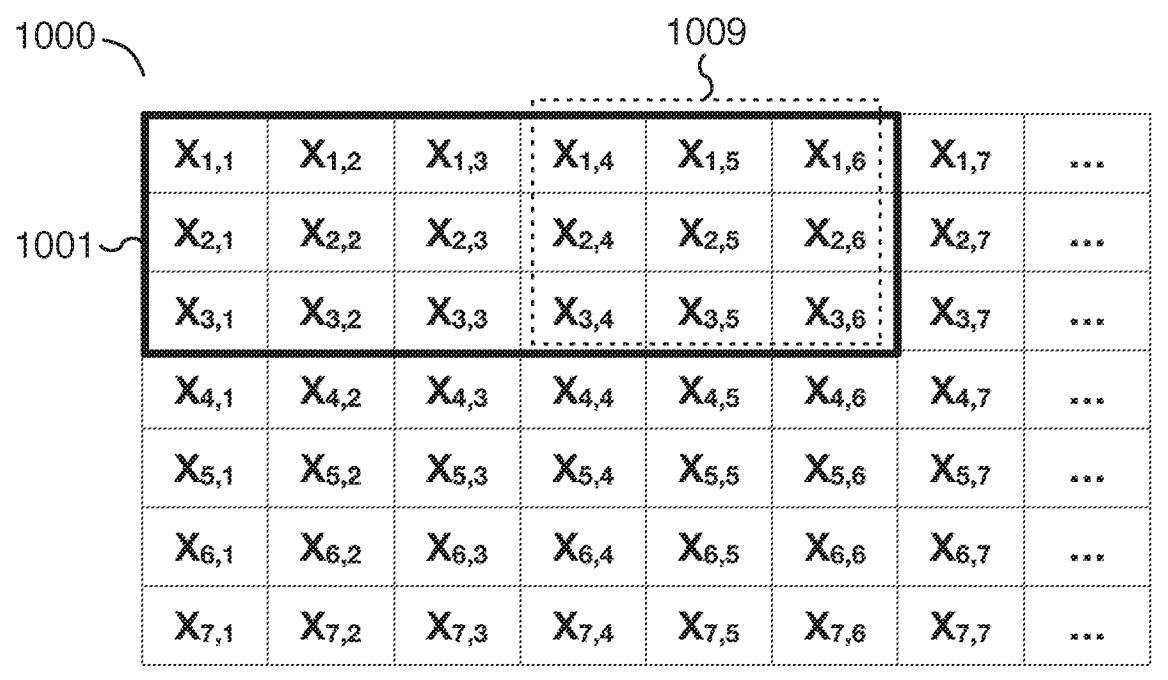

FIGS. 10A-D are diagrams illustrating a single channel of an example activation data input matrix for performing a channel convolution operation.

FIG. 13 is a diagram illustrating a single channel of an example activation data input matrix for performing a channel convolution operation traversed vertically using partition increments.

DETAILED DESCRIPTION

Figure 1:
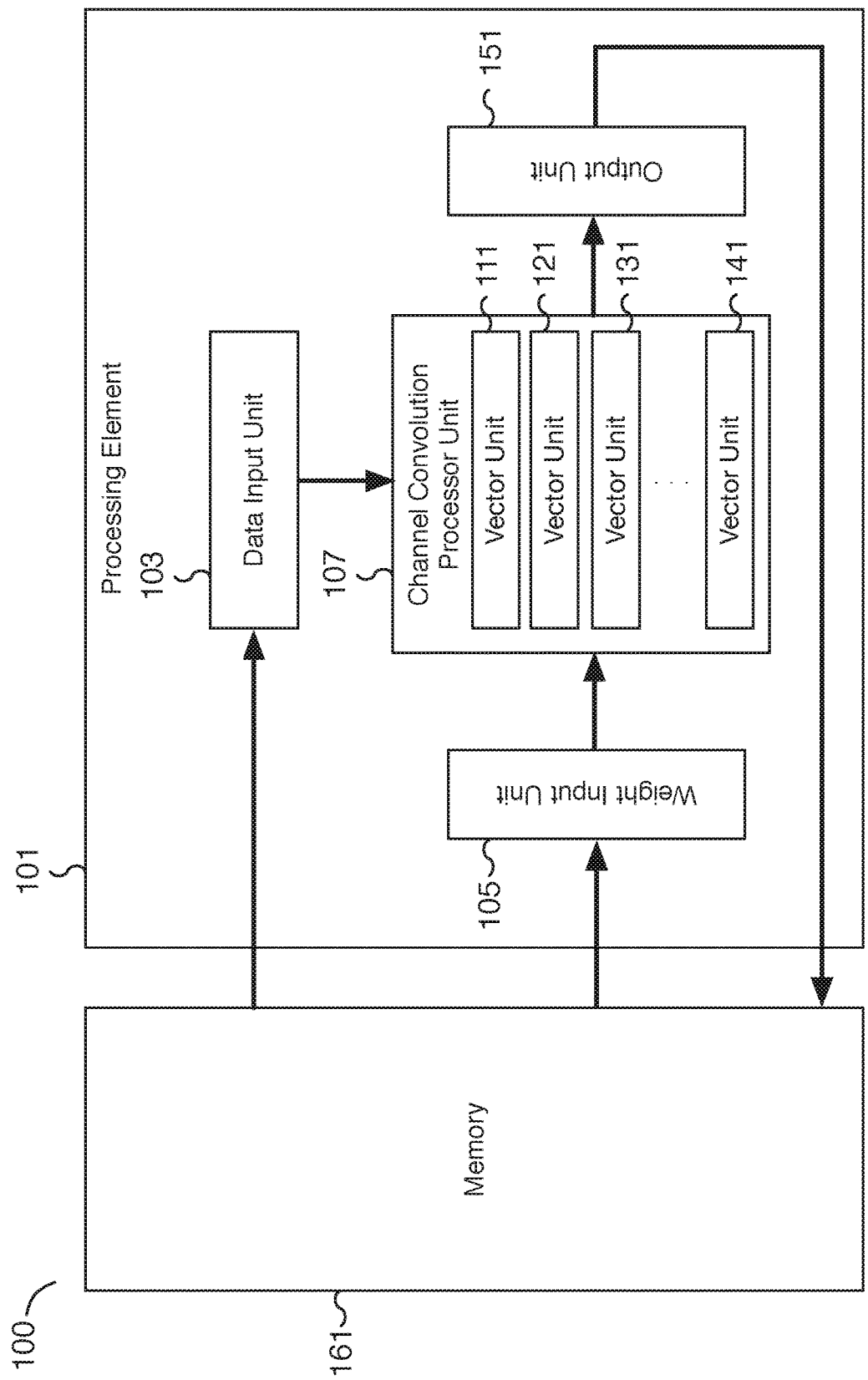
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A processor system for performing efficient convolution operations using a partition channel convolution processor is disclosed. Using the disclosed techniques, the throughput and power efficiency for computing convolution operations and in particular depthwise convolutions is significantly increased particularly for input activation data with small width and height dimensions. In some embodiments, the processor system includes a partition channel convolution processor unit capable of performing convolution operations on multiple portions of a partition of activation data by applying different weight matrices to the different channels of the different portions of the data convolution matrix partition. For example, in the context of a partition channel convolution processor unit, a partition of the data convolution matrix is a three-dimensional sub-matrix of the data convolution matrix. In some embodiments, the partition may have a channel depth based on the cache-line size. Each partition is made up of multiple different three-dimensional sub-matrix portions that each span the same channels but with different width and height offsets. The different portions of the partition (and of the data convolution matrix) can include overlapping data elements. For example, a partition of a larger data convolution matrix can have width×height× channel dimensions of 6×3×32 and each of the four portions of the partition can have dimensions 3×3×32 when utilizing a stride of 1. In the examples herein, a stride of 1 is utilized to describe the disclosed techniques although alternative stride values can be applied as appropriate. In various embodiments, different stride parameters such as stride of 2, 3, 4, or another appropriate value may be utilized and each partition will include a different appropriate number of portions.

In some embodiments, to process an entire partition made up of multiple portions, a partition channel convolution processor unit includes a plurality of calculation units such as vector units used to process input vectors of the input matrices corresponding to the different portions of the data convolution matrix partition and the corresponding weight matrices. For each portion of a data convolution matrix partition, the partition channel convolution processor unit includes a calculation unit for each channel. In various embodiments, the partition channel convolution processor unit can process multiple portions, such as 2, 3, 4, or more portions, of a data convolution matrix partition concurrently. The different three-dimensional sub-matrices of the different portions of the data convolution matrix partition can have overlapping data elements along the same matrix dimension, such as a width or height dimension, for each corresponding channel. Once channel convolution results are determined for the different portions of the data convolution matrix partition, a new set of portions of the data convolution matrix corresponding to a new partition is processed during the next iteration (or cycle) by shifting along a second dimension and using the same channels. For example, in the event portions of a partition with overlapping data elements along the width dimension are processed concurrently, each new iteration processes a new set of portions of a new partition along the height dimension. Similarly, in the event portions of a partition with overlapping data elements along the height dimension are processed concurrently, each new iteration shifts to process a new set of portions of a new partition along the height dimension. By processing (and traversing) along one dimension during each iteration, e.g., the width or height dimension, and processing (and traversing) along a second dimension between iterations, e.g., the corresponding height or width dimension, respectively, the convolution operation on the data convolution matrix is performed by traversing the data convolution matrix along two-dimensions while processing the same set of channels. This iterative process significantly increases performance and allows for significant data reuse, both for data elements of the data convolution matrix and of the weight matrices.

In various embodiments, each calculation unit of a partition channel convolution processor unit includes at least a vector multiply unit and a vector adder unit. The vector multiply unit is capable of performing multiply operations using corresponding elements of two input vectors, data elements from the same channel and weight input elements from a corresponding weight matrix. In some embodiments, the vector adder unit is used to sum the vector of multiplication results computed using a vector multiply unit. For example, the vector adder unit can be used to compute the dot product result of two vectors using the vector multiplication results of vector elements from corresponding input vectors. In some embodiments, the vector adder unit is an adder tree. For example, an adder tree computes the sum of the multiplication results by summing multiplication results and subsequent partial sums in parallel.

In some embodiments, a processor system includes a data input unit and a weight input unit for preparing partitions of a data convolution matrix and corresponding weight matrices into vector operands. The vector operands can be used as input to a channel convolution processor such as a partition channel convolution processor unit. The data input unit can load a partition of a data convolution matrix corresponding to multiple portions of a data convolution matrix compatible with the weight matrices. For example, a partition can be a 6×3×32 (height×width×channel) sub-matrix of a larger data convolution matrix. The data input unit prepares the partition into multiple smaller portions such as four 3×3×32 portions, each portion compatible with a corresponding 32 different 3×3 weight matrices. In some embodiments, the data input unit includes multiple vector registers and a subset of the data convolution matrix is loaded into each vector register. The different elements of the vector register correspond to different channels. The number of vector registers to load can correspond to the width×height of the partition. For example, using a 6×3×32 partition, the data input unit prepares eighteen vector registers, each holding 32 data elements corresponding to 32 different channels. Another appropriate partition size corresponding to a different partition width, height, and/or channel depth can be appropriate. In various embodiments, one of the width or height dimensions matches the width or height dimension of the two-dimensional weight matrices. In some embodiments, the number of channels loaded is based on a cache line size and can match the vector register size.

In some embodiments, a weight input unit prepares a number of weight matrices for the channel convolution processor. The number of weight matrices prepared corresponds to the number of channels loaded for each vector register of the data input unit. For example, 32 3×3 weight matrices may be loaded using nine vector registers of the weight input unit to correspond to loading a 32-channel partition of a data convolution matrix. In some embodiments, the data convolution matrix is loaded with multiple portions at once, for example, a 6×3×32 partition of the data convolution matrix corresponding to 4 different 3×3×32 sub-matrix portions of the data convolution matrix. Once the vector registers of the data input unit and weight input unit are loaded with activation and weight data, the corresponding elements of the vector registers are loaded into vector units of a channel convolution processor unit. The data input elements of a portion and of the same channel and a corresponding weight matrix are loaded to the same vector unit. Each vector unit calculates a dot product result by multiplying corresponding data input and weight input elements and summing together the multiplication results to determine one channel convolution result data element. The channel convolution result data elements of multiple vector units are combined to determine a corresponding portion of a channel convolution result matrix. For example, the channel convolution result data elements for each portion of a partition can be combined to determine a 1×1×32 portion of a channel convolution result matrix for each 3×3×32 portion of the data convolution matrix.

In various embodiments, once corresponding convolution results for each portion of a data convolution matrix partition are determined, the next set of portions of a new data convolution matrix partition is processed. For example, an additional vertical (or horizontal) slice of the data convolution matrix is loaded by the data input unit and used with a subset of the data from the previous partition of the data convolution matrix. In various embodiments, successive iterations can reuse data elements of the data convolution matrix used from the previous iteration and need only a new slice of additional data elements. For example, the next 6×3×32 partition of a data convolution matrix only requires loading a 6×1×32 slice of the data convolution matrix to combine with a 6×2×32 subset of the partition from the previous iteration. Similarly, a 1×6×32 slice of the data convolution matrix can be combined with a 2×6×32 subset of the partition from a previous iteration if traversing horizontally between iterations. The data elements from the previous iteration that overlap with the data elements from the current iteration are reused to minimize reloading of duplicative data. In various embodiments, the weight input data is reused across iterations resulting in significant performance efficiency.

In some embodiments, a depthwise convolution on a large activation data input matrix can be distributed across multiple processing elements, with each processing element having its own data input unit, weight input unit, and channel convolution processor. Portions for the activation data can be assigned to different processing elements to each perform a part of the depthwise convolution operation by processing partitions of multiple assigned portions concurrently. The applicable weights can be broadcasted to all applicable processing elements. The results of the different processing elements are merged to determine the channel convolution result matrix in parallel. In various embodiments, the layout of the activation data matrix, weight data matrix, and channel convolution result matrix use a channel-first layout format that increases memory and processing efficiency. For example, input arguments and output arguments for the convolution processor unit are in the same format as stored in memory and do not require complex processor and memory bandwidth intensive operations such as layout transformation operations. Utilizing a channel convolution processor, such as a partition channel convolution processor unit, for depthwise operations results in significant performance and efficiency improvements.

In some embodiments, a processor system comprises a first group of registers, a second group of registers, and a hardware channel convolution processor unit. For example, a processing element includes a data input unit with a first group of vector registers and a weight input unit with a second group of vector registers. The first group of registers is configured to store data elements of a plurality of channels of a portion of a convolution data matrix, wherein each register of the first group of registers stores at least one data element from each of the plurality of channels. The stored data elements may correspond to a partition of a convolution data matrix. In some embodiments, the convolution data matrix is a three-dimensional matrix, such as a three-dimensional machine learning matrix, with width, height, and channel dimensions. For example, in some embodiments, each register of the first group is a vector register that stores a vector of data elements, each data element corresponding to a different channel of the convolution data matrix, such as channels 1 through 32 for a 32-element vector register. In various embodiments, each register of the first group of registers can further correspond to a different width and height location of the convolution data matrix. The second group of registers is configured to store data elements of a plurality of convolution weight matrices including a separate convolution weight matrix for each of the plurality of channels, wherein each register of the second group of registers stores at least one data element from each of the plurality of convolution weight matrices. In some embodiments, each weight matrix is a two-dimensional matrix with width and height dimensions and there may be as many weight matrices as there are channels of the convolution data matrix. For example, in some embodiments, each register of the second group is a vector register that stores a vector of weight data elements, each weight data element corresponding to a different convolution weight matrix. A 32-element vector register can store weight data elements from 32 different convolution weight matrices, each of the weight matrices corresponding to a different channel of the convolution data matrix. In various embodiments, each register of the second group of registers corresponds to a different width and height location of the corresponding convolution weight matrices. In various embodiments, for the same number of represented channels, the total count of the stored data elements of the first group of registers can exceed a total count of the stored data elements of the second group of registers. For example, the number of data elements stored from the convolution data matrix is greater than the number of weight data elements stored from the plurality of convolution weight matrices. By loading more data elements from the convolution data matrix, multiple portions of the data convolution matrix can be processed concurrently using the same corresponding weight data elements.

In some embodiments, the channel convolution processor unit is configured to, for each data element in a first portion of the first group of registers, multiply the data element in the first portion with a corresponding data element in the second group of registers to determine a corresponding multiplication result in first multiplication results. For example, each data element associated with a first portion of the convolution data matrix is multiplied with a corresponding weight data element of the convolution weight matrix. The data elements of the first portion can correspond to data elements of one of multiple portions of a partition of the convolution data matrix stored in the first group of registers. The channel convolution processor unit is also configured to, for each data element in a second portion of the first group of registers, multiply the data element in the second portion with a corresponding data element in the second group of registers to determine a corresponding multiplication result in second multiplication results. The second portion can correspond to a different portion of the convolution data matrix from the first portion. In some embodiments, the two portions are part of a partition of the convolution data matrix and can have overlapping data elements. The first and second multiplication results are separate multiplication results determined at least in part concurrently and each corresponds to different portions of the convolution data matrix but utilize the same corresponding portions of the convolution weight matrix.

In some embodiments, the channel convolution processor unit is configured to, for each specific channel of the plurality of channels, sum together ones of the first multiplication results corresponding to the specific channel to determine one corresponding channel convolution result data element in a corresponding channel convolution result matrix and sum together ones of the second multiplication results corresponding to the specific channel to determine another one corresponding channel convolution result data element in the corresponding channel convolution result matrix. For example, multiplication results of the same channel are summed together for each portion to determine a corresponding channel convolution result data element corresponding to each portion. Each sum of the multiplication results corresponds to applying a convolution weight matrix to a single channel and subset of data elements of the convolution data matrix. In some embodiments, each sum of the multiplication results corresponds to at least a partial dot product result for a channel of the convolution data matrix. By processing multiple portions of the convolution data matrix, at least in part concurrently, to determine corresponding channel convolution result data elements, a significant performance improvement is achieved in determining the corresponding channel convolution result matrix, especially when compared to a general purpose processor. The amount of data layout transformation is significantly reduced and the amount of data element reuse is significantly increased.

FIG. 1 is a block diagram illustrating an embodiment of a system for solving artificial intelligence problems using a neural network. In the example shown, system 100 includes processing element 101 and memory 161. Processing element 101 includes data input unit 103, weight input unit 105, channel convolution processor unit 107, and output unit 151. In some embodiments, processing element 101 is a hardware integrated circuit, for example, an application specific integrated circuit (ASIC) and includes hardware components data input unit 103, weight input unit 105, channel convolution processor unit 107, and output unit 151. As compared to a general purpose processor, processing element 101 is designed and implemented using a specialized hardware integrated circuit to more efficiently perform one or more specific computing tasks related to performing convolution operations and/or solving artificial intelligence problems using a neural network. The specialized hardware results in significant performance improvements and resource efficiencies gained over using a general purpose processor. In the example shown, channel convolution processor unit 107 includes multiple vector calculation units including at least vector units 111, 121, 131, and 141. In various embodiments, channel convolution processor unit 107 receives data input vectors (not shown) from data input unit 103 and weight input vectors (not shown) from weight input unit 105. For example, in some embodiments, data input vectors are generated by data input unit 103 that correspond to 2D sub-matrices of a 3D activation data input matrix, where each 2D sub-matrix corresponds to a different channel of the 3D activation data input matrix. The 2D sub-matrices can correspond to different portions of the 3D activation data input matrix to process multiple portions of the activation data in parallel. In some embodiments, the multiple portions make up a partition of the 3D activation data input matrix. For each iteration or cycle, channel convolution processor unit 107 processes each portion of the partition at least in part concurrently to determine corresponding channel convolution result data elements. Between iterations, a new partition and corresponding portions of the new partition are selected for data input unit 103 to prepare and channel convolution processor unit 107 to determine corresponding channel convolution result data elements. Across iterations, weight input vectors generated by weight input unit 105 that correspond to different weight matrices can be reused. In various embodiments, the 2D sub-matrices of the 3D activation data input matrix and the weight matrices may be 3×3 matrices or another appropriate size. The data elements of the activation data input matrix and the weight input matrices may be stored and retrieved from memory 161.

In some embodiments, each generated data input vector and weight input vector pair may be passed as arguments to a vector calculation unit, such as one of vector units 111, 121, 131, and 141, of channel convolution processor unit 107. For example, a vector unit of channel convolution processor unit 107 may determine a channel convolution result data element, such as a dot product result, using a data input vector and weight input vector pair. In some embodiments, channel convolution processor unit 107 is a partition channel convolution processor unit and includes multiple sets of vector units. For example, channel convolution processor unit 107 may include four sets of vector units, where each set includes 32 vector units, or another appropriate number and set of vector units. Each vector unit set corresponds to a portion of a partition of an activation data input matrix that channel convolution processor unit 107 can process in parallel. The number of vector units in each set corresponds to the number of channels, such as 32 or another appropriate number, that channel convolution processor unit 107 can process in parallel. A channel convolution processor unit that can process four portions in parallel, where each portion corresponds to 32 channels, includes 4×32 or 128 vector units. The number of vector units may be based on the cache line size, for example, the cache line size or a multiple of the cache line size. For example, the cache line multiple can be four and the number of vector units may be equal to four times the cache line size. Each vector unit may take data elements corresponding to two vectors as arguments and can each produce a single element result. Using 3×3 matrices as an example, each vector unit takes two 9-element vectors as arguments, one vector corresponding to a sub-matrix of the activation data input matrix and one vector corresponding to a weight matrix. Taken across all vector units of channel convolution processor unit 107, the results include an output vector result corresponding to each portion of the partition processed in parallel. The output vector results also correspond to data elements of a channel convolution result matrix. Over additional iterations, different partitions and their corresponding portions of the activation data input matrix are processed using the same weight matrices by channel convolution processor unit 107 to determine additional data elements of the channel convolution result matrix. In various embodiments, the output of channel convolution processor unit 107 for each iteration is received at output unit 151 as output vectors. One output vector can be received for each portion of a partition that is processed. In some embodiments, the output vectors received at output unit 151 are each 32-element vectors. Although 32 channels are processed using 3×3 matrices for each iteration in the example above, the size of the elements and matrices processed by system 100 can be configured as appropriate. For example, elements may be 4-bits, 8-bits, 2-byte, 4-bytes, or another appropriate size. Similarly, the sub-matrices of the activation data input matrix and weight matrices can be 3×3, 5×5, or another appropriate size. In some embodiments, a partition of the 3D activation data input matrix can include fewer or more portions and channel convolution processor unit 107 using a single partition as input can process fewer or more corresponding portions of the 3D activation data input matrix concurrently.

In some embodiments, channel convolution processor unit 107 is configured to receive multiple pairs of input matrices. Each pair of input matrices includes a data input matrix and a corresponding weight matrix. Each data input matrix corresponds to a particular channel of a portion of an activation data input matrix partition and is processed by data input unit 103. Each weight input matrix corresponds to the weight matrix to be applied to the channel and is processed by weight input unit 105. Data input unit 103, weight input unit 105, and output unit 151 may be implemented using hardware registers, such as flip-flop circuits, for transferring multiple input and output elements to/from channel convolution processor unit 107. In some embodiments, elements corresponding to each data input vector are retrieved from memory 161 and loaded into a corresponding vector unit, such as vector units 111, 121, 131, or 141, of channel convolution processor unit 107 via data input unit 103. For example, a channel convolution processor unit with 128 vector units can be loaded via data input unit 103 with data elements corresponding to four portions of an activation data input matrix partition, where each portion has data elements corresponding to the same 32 different channels of the activation data input matrix. Similarly, elements corresponding to each weight input vector are retrieved from memory 161 and loaded into a corresponding vector unit, such as vector units 111, 121, 131, or 141, of channel convolution processor unit 107 via weight input unit 105. For example, a channel convolution processor unit with 128 vector units to concurrently process four portions of an activation data input matrix partition can be loaded via weight input unit 105 with 128 vectors of weight input elements corresponding to 32 different weight matrices. The set of vector units for each of the portions receives the same weight input elements since the portions share the same range of channels and corresponding weight matrices. In some embodiments, only the 32 different vectors of weight input elements are loaded to channel convolution processor unit 107 and channel convolution processor unit 107 broadcasts the corresponding weight input vectors to the appropriate vector units.

As results corresponding to a partition of the activation data input matrix are determined, additional data elements are loaded for processing additional partitions of the activation data input matrix and their corresponding new portions utilizing the same weight matrices. For example, data input unit 103 loads additional needed data elements and generates new data input vectors corresponding to the new portions of the new activation data input matrix partition for determining additional channel convolution results. As the data input vectors change to correspond to new partitions and corresponding portions of the activation data input matrix, the weight input vectors can remain the same and can be reused, significantly improving the efficiency of convolution operations. In various embodiments, the thick arrows of FIG. 1 represent the direction data moves through the components of system 100. For example, the arrows may correspond to multi-element wide communication/data buses and/or data lines. In various embodiments, an output vector result received at output unit 151 can be written back to memory 161.

In various embodiments, each vector unit of channel convolution processor unit 107, such as vector units 111, 121, 131, or 141, receives two vector operands and can perform one or more vector operations. For example, a vector unit can compute the dot product of the two input operands and output the result as one element of an output vector to output unit 151. In various embodiments, the output result of a vector unit corresponds to a channel convolution result data element of a corresponding channel convolution result matrix. In some embodiments, each vector unit of channel convolution processor unit 107, such as vector units 111, 121, 131, or 141, includes both a multiply unit and an adder unit (not shown).

In some embodiments, multiple instances of processing element 101 can operate in parallel to process different parts, such as different partitions, of an activation data input matrix. For example, each processing element can retrieve its assigned data elements of the activation data input matrix and corresponding weight matrices from memory 161. In some embodiments, different processing elements share weight matrices and the data elements of the shared weight matrices can be broadcasted to the appropriate processing elements to improve memory efficiency. Each processing element performs depthwise convolution operations on the assigned partitions of the activation data input matrix using its own channel convolution processor unit. The results of each processing element can be combined, for example, by writing the results to a shared memory location such as memory 161. In some embodiments, channel convolution processor unit 107 includes the functionality of data input unit 103, weight input unit 105, and/or output unit 151.

Figure 2:
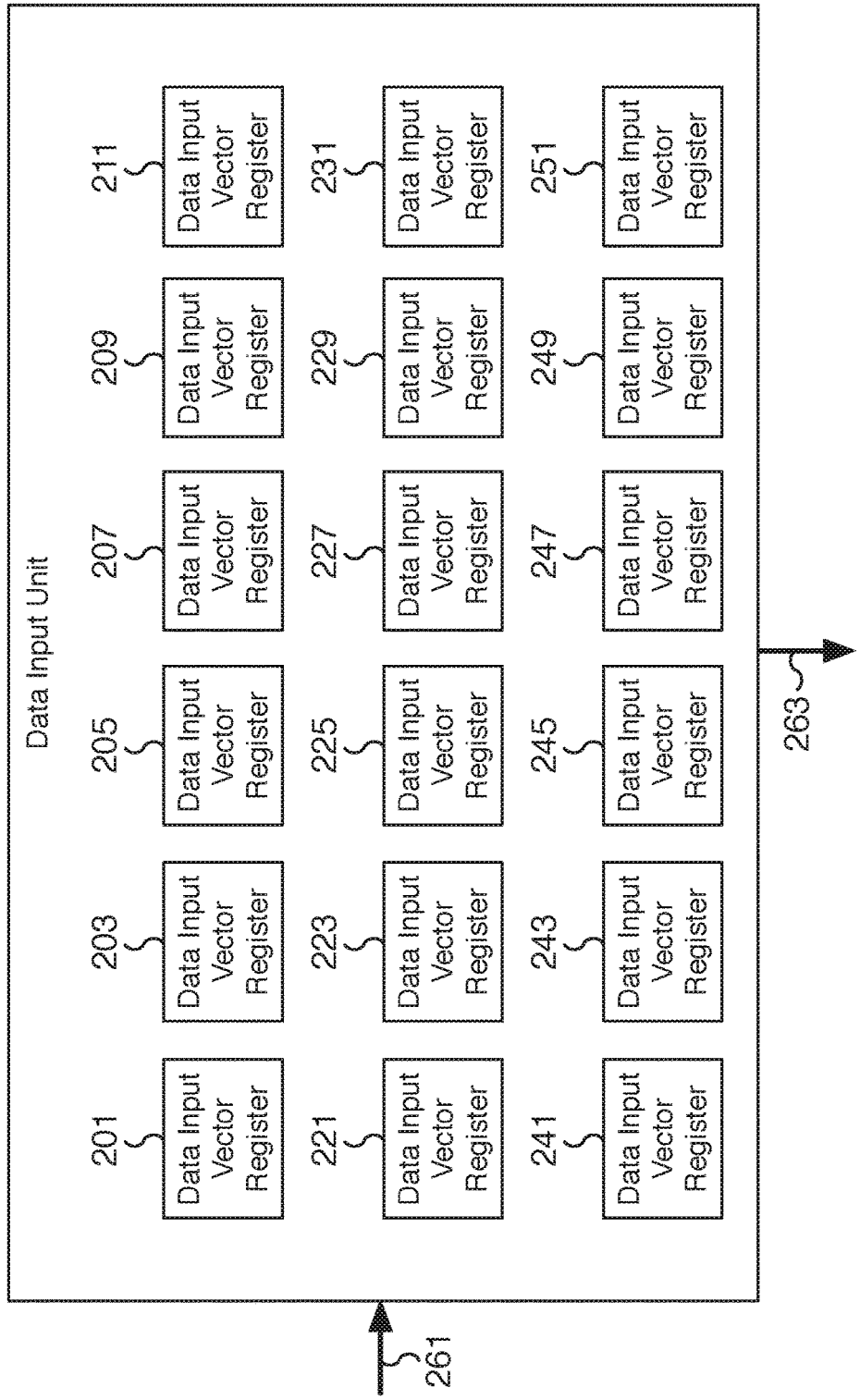
FIG. 2 is a block diagram illustrating an embodiment of a data input unit for preparing data input matrices for a channel convolution processor.

FIG. 2 is a block diagram illustrating an embodiment of a data input unit for preparing data input matrices for a channel convolution processor. Data input unit 200 includes multiple data input vector registers such as data input vector registers 201, 203, 205, 207, 209, 211, 221, 223, 225, 227, 229, 231, 241, 243, 245, 247, 249, and 251. Data input unit 200 receives input data via connection 261 and writes output data as convolution matrix arguments via connection 263. In some embodiments, connections 261 and/or 263 are multi-element wide communication/data buses and/or data lines. In some embodiments, connection 261 communicatively connects data input unit 200 to memory such as memory 161 of FIG. 1 and connection 263 communicatively connects data input unit 200 to a channel convolution processor unit such as channel convolution processor unit 107 of FIG. 1. For example, data elements may be retrieved from memory via connection 261, processed by data input unit 200 into appropriate convolution matrix arguments arranged by channel, and passed to a channel convolution processor unit as convolution matrix arguments via connection 263. In some embodiments, the convolution matrix arguments are passed as data input vectors, where each data input vector corresponds to a particular channel of a portion of an activation data input matrix.

In some embodiments, the number of data input vector registers of data input unit 200 corresponds to the size of the partition of the convolution data input matrix used for performing depthwise convolution and is further based on the dimensions of the corresponding convolution weight matrices. For example, the number of data input vector registers can match the number of elements in a two dimensional slice of the partition. For example, a 6×3×32 (width×height×channel) partition can include 6×3 or 18 data input vector registers, one for each unique width and height location of the partition. In some embodiments, the data input vector registers are configured to process a partition that has one dimension (e.g., height or width) that matches a dimension of the corresponding two-dimensional weight matrices. For example, a 6×3×32 or 3×6×32 partition has width and height dimensions, respectively, to match 3×3 weight matrices. The length of each data input vector register corresponds to the number of channels that can be processed in parallel, for example 32 when processing a 6×3×32 partition of a convolution data input matrix. In some embodiments, the number of channels processed in parallel corresponds to the cache line size or a multiple of the cache line size. For example, a 32-element cache line and a 32-element data input vector register allows an entire cache line to be read into a single data input vector register, such as data input vector registers 201, 203, 205, 207, 209, 211, 221, 223, 225, 227, 229, 231, 241, 243, 245, 247, 249, or 251.

In the example shown, each data input vector register, such as data input vector registers 201, 203, 205, 207, 209, 211, 221, 223, 225, 227, 229, 231, 241, 243, 245, 247, 249, and 251, stores data elements from different channels. For example, 32 different data elements corresponding to 32 different channels of an activation data input matrix are stored in each data input vector register of data input unit 200. Using the data input vector registers, data input unit 200 prepares convolution matrix arguments for a channel convolution processor unit such as a partition channel convolution processor unit. A data element from each data input vector register is identified based on the channel. For example, the first element of each data input vector register is identified and, in this example, corresponds to the first channel of an activation data input matrix. By selecting the correct set of data input vector registers, different portions of the partition can be prepared and processed into data input matrices that match corresponding weight matrices. Using a 3×3 matrix example, nine data elements are identified from nine data input vector registers and correspond to a 3×3 matrix from channel 1. The group of second data elements of each of the same nine data input vector registers corresponds to a 3×3 matrix from channel 2 of the same portion of the partition of the convolution data input matrix. The group of third data elements of each of the same nine data input vector registers corresponds to a 3×3 matrix from channel 3, and so forth. Although the example uses an initial offset of channel 1, the first element can correspond to another channel as appropriate and may be based on the cache line size. For example, the first element of each data input vector register may correspond to channel 1, 33, 65, or another appropriate channel. By selecting a different set of data input vectors, a different portion of the partition can be processed to prepare a different set of 3×3 data input matrices. In various embodiments, the group of data elements from the same index of a set of data input vector registers together form a data input vector. For each set of 32-element data input vector registers, 32 groups of data elements correspond to 32 different data input vectors, each associated with a different channel of the convolution data input matrix. In the example shown, 18 vector units can load four different 3×3 portions of a partition, each with the same channel depth, such as 32-elements. Each portion utilizes a different set of 9 data input vector registers. For example, in some embodiments, a first portion utilizes data input vectors registers 201, 203, 205, 221, 223, 225, 241, 243, and 245. A second portion utilizes data input vectors registers 203, 205, 207, 223, 225, 227, 243, 245, and 247. A third portion utilizes data input vectors registers 205, 207, 209, 225, 227, 229, 245, 247, and 249. And a fourth portion utilizes data input vectors registers 207, 209, 211, 227, 229, 231, 247, 249, and 251.

In some embodiments, data input unit 200 includes additional vector registers (not shown) for storing the data input vectors as arranged by channel. Data input unit 200 passes the prepared data input vectors to a channel convolution processor via connection 263. In various embodiments, at the channel convolution processor, the different data input vectors are loaded into different vector units with corresponding weight input vectors for performing a convolution operation.

In some embodiments, data input unit 200 is data input unit 103 of FIG. 1 and the channel convolution processor unit connected to data input unit 200 via connection 263 is channel convolution processor unit 107 of FIG. 1. In various embodiments, the data vector inputs prepared by data input unit 200 for the channel convolution processor unit are directed to a vector unit of the channel convolution processor such as vector units 111, 121, 131, or 141 of FIG. 1. Although 3×3 matrices are used in the example above, a different matrix size can be appropriate and data input unit 200 can be configured to process the different matrix size by utilizing an appropriate number of data input vector registers. For example, using 32-channels and 5×5 matrices with a stride of 1, thirty-five data input vector registers can be utilized to process three different 5×5×32 portions of a 7×5×32 partition.

In some embodiments, data input unit 200 loads only the additional data elements of an activation data input matrix when processing subsequent partitions and their respective portions of the activation data input matrix. For example, after an initial partition of an activation data input matrix is processed, only a subset of the next partition is needed. Existing data elements stored in a subset of the data input vector registers can be reused. For example, in some embodiments, a 6×3×32 initial partition is first loaded into eighteen 32-element data input vector registers of data input unit 200. Subsequent iterations only require loading a 6×1×32 slice of the activation data input matrix when traversing vertically to process the next partition of the activation data input matrix. The new partition requires only loading six new data input vector registers. The data elements from twelve of the data input vector registers can be reused. For example, data input vector registers corresponding to the second rows of the convolution matrices from the previous iteration are now used to prepare the first rows of the new convolution matrices. Similarly, data input vector registers corresponding to the third rows of the convolution matrices from the previous iteration are now used to prepare the second rows of the new convolution matrices. The three newly loaded data input vector registers are used to prepare the third row of the new convolution matrices. In some embodiments, one or more multiplexers are used to select the correct data elements and/or data input vector registers for preparing the convolution matrices. In some embodiments, the new additional data is a 1×6×32 portion of the activation data input matrix when traversing horizontally to process the next partition of the activation data input matrix. Although some of the examples above describe a partition of the convolution data input matrix that includes four portions, in various embodiments, a partition can include a different number of portions. For example, a partition can include two, three, four, or more portions that can be prepared and processed at least in part concurrently for performing a convolution operation.

Figure 3:
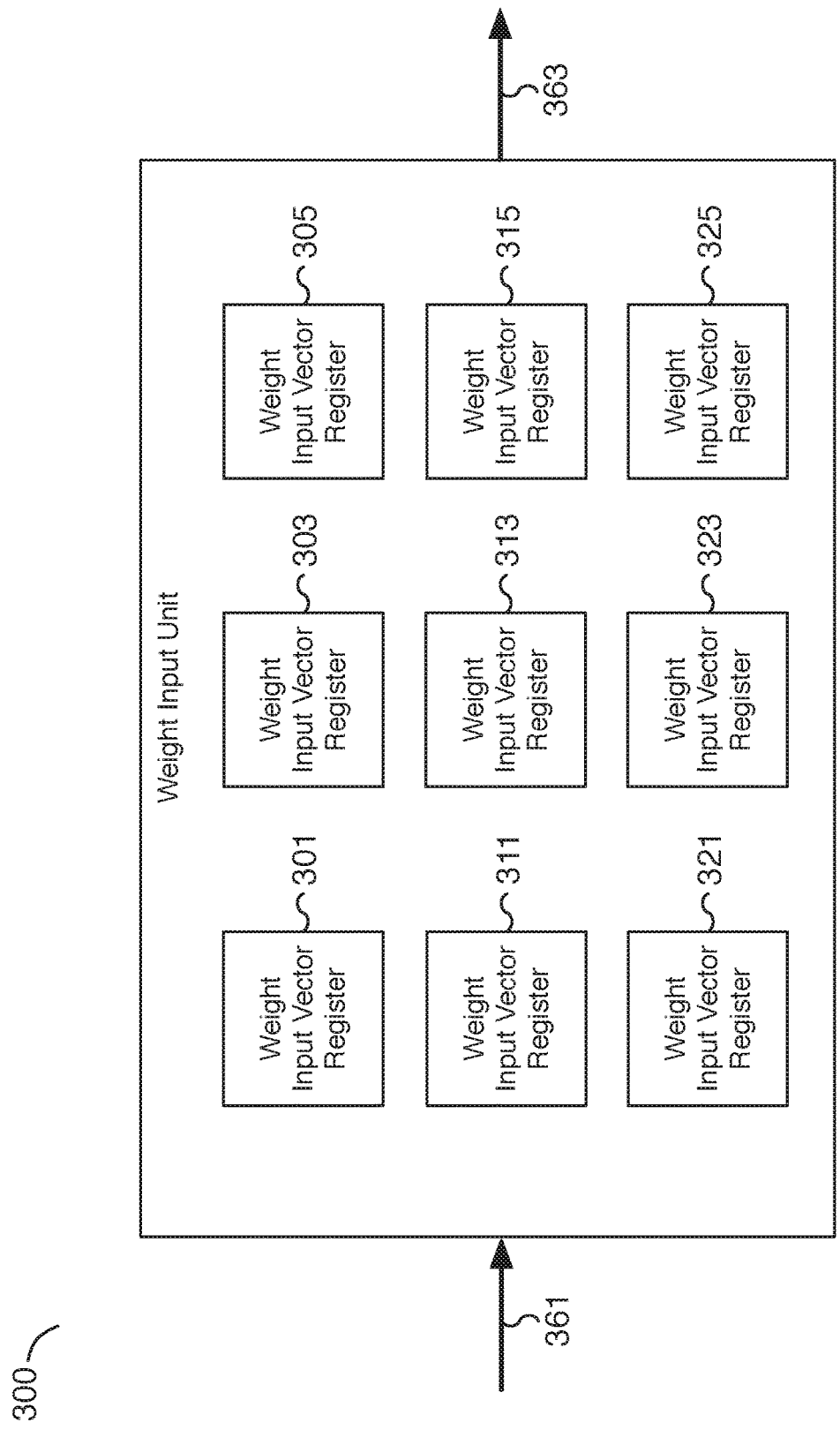
FIG. 3 is a block diagram illustrating an embodiment of a weight input unit for preparing weight input matrices for a channel convolution processor.

FIG. 3 is a block diagram illustrating an embodiment of a weight input unit for preparing weight input matrices for a channel convolution processor. Weight input unit 300 includes multiple weight input vector registers such as weight input vector registers 301, 303, 305, 311, 313, 315, 321, 323, and 325. Weight input unit 300 receives weight input data via connection 361 and writes output weight data as convolution matrix arguments via connection 363. In some embodiments, connections 361 and/or 363 are multi-element wide communication/data buses and/or data lines. In some embodiments, connection 361 communicatively connects weight input unit 300 to memory such as memory 161 of FIG. 1 and connection 363 communicatively connects weight input unit 300 to a channel convolution processor unit such as channel convolution processor unit 107 of FIG. 1. For example, weight data elements may be retrieved from memory via connection 361, processed by weight input unit 300 into appropriate convolution matrix arguments arranged by weight filters, and passed to a channel convolution processor unit as convolution matrix arguments via connection 363. In some embodiments, the convolution matrix arguments are passed as weight input vectors, where each weight input vector corresponds to a particular weight filter matrix associated with a particular channel of a portion of an activation data input matrix.

In some embodiments, the number of weight input vector registers of weight input unit 300 corresponds to the size of the corresponding weight matrices used for performing depthwise convolution. For example, a 3×3 weight matrix has nine weight elements and each weight element can be stored in a different weight input vector register. The nine weight elements for each weight matrix correspond to nine weight input vector registers. As another example, a 5×5 weight matrix has twenty-five weight elements and each weight element can be stored in a different one of twenty-five different weight input vector registers. In various embodiments, weight input unit 300 can be configured with a corresponding number of weight input vector registers for other weight matrix sizes as appropriate.

In some embodiments, the length of each weight input vector register corresponds to the number of weight matrices that can be processed in parallel with corresponding channels of an activation data input matrix. In some embodiments, a weight matrix exists for every channel of the activation data input matrix, which can far exceed the length of a weight input vector register. The number of weight matrices that are processed in parallel and the corresponding number of channels processed in parallel may be based on the cache line size or a multiple of the cache line size. For example, a 32-element cache line and a 32-element weight input vector register allows an entire cache line of weight data elements from different weight matrices to be read into a single weight input vector register, such as weight input vector registers 301, 303, 305, 311, 313, 315, 321, 323, or 325. In various embodiments, the weight matrices are stored in a channel-first layout format that allows for very efficient memory access when loading cache-line sized weight input data.

In the example shown, each weight input vector register, such as weight input vector registers 301, 303, 305, 311, 313, 315, 321, 323, and 325, stores weight data elements from different weight matrices. For example, 32 different weight data elements corresponding to 32 different weight matrices are stored in each weight input vector register of weight input unit 300. Using the weight input vector registers, weight input unit 300 prepares convolution matrix arguments for a channel convolution processor unit. A weight data element from each weight input vector register is identified based on the corresponding channel of the activation data input matrix. For example, the first element of each weight input vector register is identified and, in this example, corresponds to the weight matrix for the first channel of an activation data input matrix. Using a 3×3 matrix example, nine weight data elements are identified and correspond to a 3×3 weight matrix associated with channel 1. The group of second data elements of each weight input vector register corresponds to a 3×3 weight matrix associated with channel 2. The group of third weight data elements of each weight input vector register corresponds to a 3×3 weight matrix associated with channel 3, and so forth. Although the example associates the initial offset of each weight input vector register with channel 1, the first element can be associated with another channel of the activation data input matrix as appropriate and may be based on the cache line size. For example, the first element of each weight input vector register may correspond to channel 1, 33, 65, or another appropriate channel. In various embodiments, the group of weight data elements from the same index in the weight input vector registers together form a weight input vector. For 32-element weight input vector registers, 32 groups of weight data elements correspond to 32 different weight input vectors, each a different weight matrix and associated with a different channel of an activation data input matrix. In various embodiments, a copy of each weight input vector is directed to each portion of a partition. For example, in the event a partition includes four portions that are processed concurrently, the processed weight input vectors are each utilized four times for each iteration, once for each corresponding portion of a partition. In some embodiments, a single copy of the weight input vector is transmitted to the channel convolution processor unit and the channel convolution processor unit broadcasts the weight input vectors accordingly to the appropriate vector units of each portion of a partition. In some embodiments, the weight input vectors are duplicated to match the total number of corresponding data input vectors.

In some embodiments, weight input unit 300 includes additional vector registers (not shown) for storing the weight input vectors once arranged as weight matrices and associated by channel. Weight input unit 300 passes the prepared weight input vectors to a channel convolution processor via connection 363. In various embodiments, at the channel convolution processor, the different weight input vectors are loaded into different vector units with corresponding data input vectors for performing a convolution operation. In some embodiments, as different partitions and portions of an activation data input matrix are processed, the same weight matrices are applied and the channel convolution processor unit can reuse the same prepared weight input vectors. By reusing the same weight matrices, the performance and efficiency of the convolution operation is significantly improved.

In some embodiments, weight input unit 300 is weight input unit 105 of FIG. 1 and the channel convolution processor unit connected to weight input unit 300 via connection 363 is channel convolution processor unit 107 of FIG. 1. In various embodiments, the weight vector inputs prepared by weight input unit 300 for the channel convolution processor unit are directed to a vector unit of the channel convolution processor such as vector units 111, 121, 131, or 141 of FIG. 1. Although 3×3 matrices are used in the example above, a different matrix size can be appropriate and weight input unit 300 can be configured to process the different matrix size by utilizing an appropriate number of weight input vector registers. For example, twenty-five weight input vector registers can be utilized to process and prepare convolution matrix arguments with 5×5 weight matrices.

Figure 4:
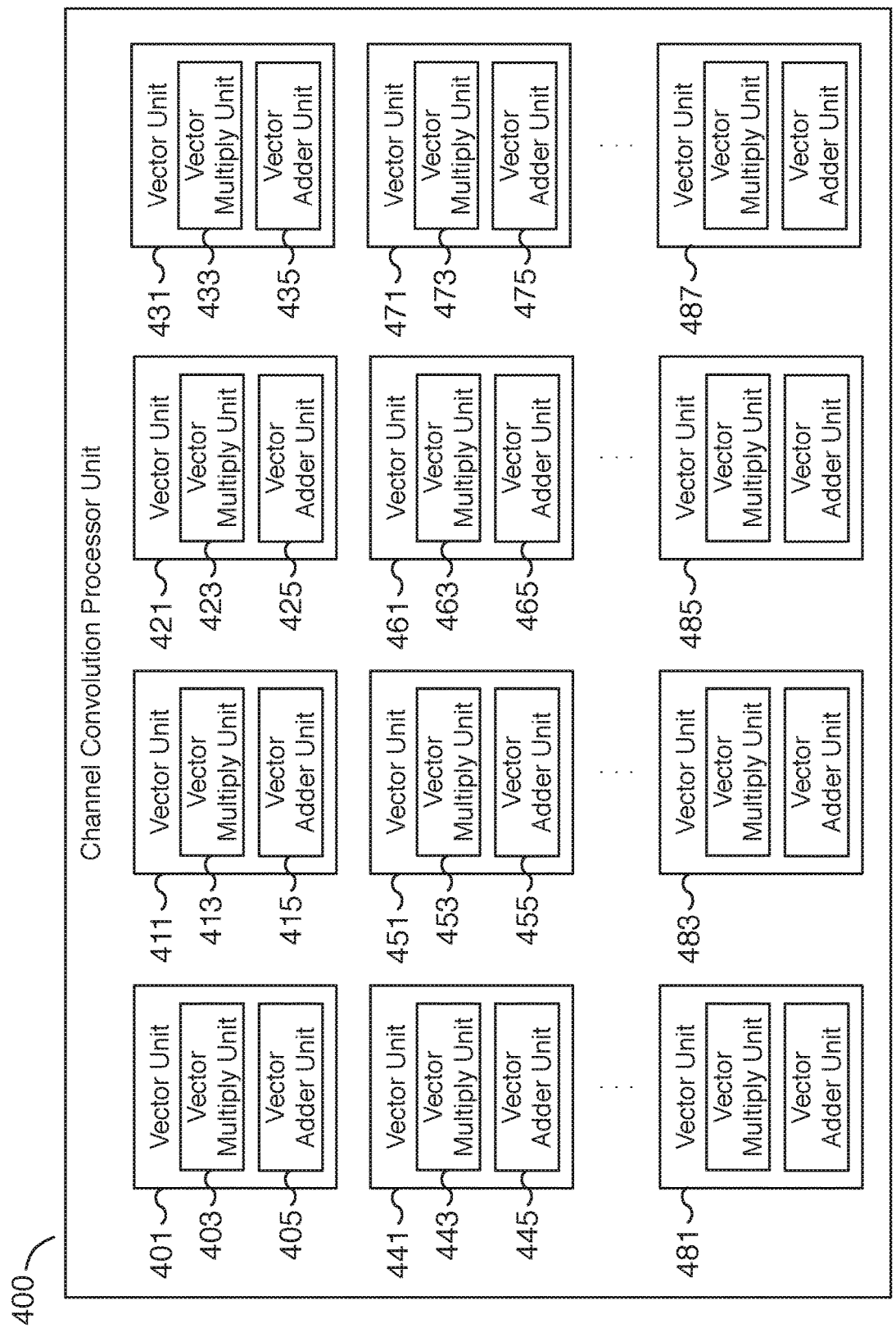
FIG. 4 is a block diagram illustrating an embodiment of a channel convolution processor unit for solving artificial intelligence problems using a neural network.

FIG. 4 is a block diagram illustrating an embodiment of a channel convolution processor unit for solving artificial intelligence problems using a neural network. In the example shown, channel convolution processor unit 400 can be configured as a partition channel convolution processor unit and includes multiple vector units including vector units 401, 411, 421, 431, 441, 451, 461, 471, 481, 483, 485, and 487. The three dots between vector units 441 and 481, between vector units 451 and 483, between vector units 461 and 485, and between vector units 471 and 487 indicate optional additional vector units (not shown), for example, to process additional channels. In various embodiments, a channel convolution processor unit may include more or fewer vector units to process a partition of a convolution data input matrix with more or fewer portions of a partition concurrently. The number of vector units corresponds to the number of portions in a partition, channels of a portion, and associated weight matrices that can be processed in parallel. For example, a channel convolution processor unit may include four sets of 32 vector units. The four different sets of vector units each process a different portion of a partition of the activation data input matrix at least in part concurrently. Further, each of the 32 vector units of a set processes a different channel of the activation data input matrix with an associated weight matrix. In some embodiments, each vector unit includes a vector multiply unit and a vector adder unit. In the example shown, vector unit 401 includes vector multiply unit 403 and vector adder unit 405. Similarly, vector unit 411 includes vector multiply unit 413 and vector adder unit 415, vector unit 421 includes vector multiply unit 423 and vector adder unit 425, vector unit 431 includes vector multiply unit 433 and vector adder unit 435, vector unit 441 includes vector multiply unit 443 and vector adder unit 445, vector unit 451 includes vector multiply unit 453 and vector adder unit 455, vector unit 461 includes vector multiply unit 463 and vector adder unit 465, and vector unit 471 includes vector multiply unit 473 and vector adder unit 475. Vector units 481, 483, 485, and 487 include their own respective vector multiply unit and vector adder unit as shown but not numbered. In various embodiments, channel convolution processor unit 400 is channel convolution processor unit 107 of FIG. 1 and vector units 401, 411, 421, 431, 441, 451, 461, 471, 481, 483, 485, and 487 are a vector unit of a channel convolution processor unit such as one of vector units 111, 121, 131, or 141 of FIG. 1.

In some embodiments, each vector unit of channel convolution processor unit 400, such as vector units 401, 411, 421, 431, 441, 451, 461, 471, 481, 483, 485, and 487, receives two vector operands and can perform one or more vector operations using the operands. For example, a vector unit can compute the result of multiple multiply operations by multiplying each element of the first input vector with a corresponding element of a second input vector. The resulting multiplication results can be summed together to determine a channel convolution result data element. In some embodiments, the vector operands are a data input vector and a weight input vector and correspond to data elements of a single channel of a portion of an activation data input matrix and a weight matrix, respectively. In various embodiments, the data input vector and the weight input vector are received from a data input unit and a weight input unit, respectively. In some embodiments, the data input unit is data input unit 103 of FIG. 1 and/or data input unit 200 of FIG. 2 and the weight input unit is weight input unit 105 of FIG. 1 and/or weight input unit 300 of FIG. 3.

In the example shown, channel convolution processor unit 400 includes multiple vector units that each include a vector multiply and a vector adder unit. Each vector multiply unit, such as vector multiply units 403, 413, 423, 433, 443, 453, 463, or 473, is configured to multiply corresponding elements received via a data input unit (not shown) and a weight input unit (not shown). In some embodiments, the result is a vector of multiplication results. For example, for two 9-byte input vectors corresponding to two 3×3 matrices, the result of a vector multiply unit is a vector of 9 multiplication results. The first element from a data input vector is multiplied with the first element of a weight input vector. Similarly, the second element from a data input vector is multiplied with the second element of a weight input vector. In various embodiments, corresponding elements from a data input vector and a weight input vector are multiplied in parallel. In various embodiments, the vector of multiplication results is passed to a vector adder unit of the vector unit. For example, vector multiply unit 403 passes its multiplication results to vector adder unit 405, vector multiply unit 413 passes its multiplication results to vector adder unit 415, vector multiply unit 423 passes its multiplication results to vector adder unit 425, and vector multiply unit 473 passes its multiplication results to vector adder unit 475. Similarly, the vector multiple units of vector units 431, 441, 451, 461, 481, 483, 485, and 487 pass their respective multiplication results to their respective vector adder units.

In some embodiments, each vector adder unit of a vector unit, such as vector adder units 405, 415, 425, 435, 445, 455, 465, or 475, is configured to compute addition operations using elements from an input vector. For example, the sum of selected elements from a vector of multiplication results computed by vector multiply unit 403 is computed by vector adder unit 405. Similarly, the sum of each of the elements from a vector of multiplication results computed by vector multiply unit 413 is computed by vector adder unit 415, the sum of each of the elements from a vector of multiplication results computed by vector multiply unit 423 is computed by vector adder unit 425, and the sum of each of the elements from a vector of multiplication results computed by vector multiply unit 473 is computed by vector adder unit 475. Similarly, the sum of each of the elements from a vector of multiplication results computed by the vector multiply units of vector units 431, 441, 451, 461, 481, 483, 485, and 487 is computed by the corresponding vector adder unit of the respective vector units. In some embodiments, the result of a vector adder unit is a dot product of the vectors used as input to the corresponding vector unit and vector multiply unit. In various embodiments, each vector adder unit, such as vector adder units 405, 415, 425, 435, 445, 455, 465, or 475, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In various embodiments, each adder tree computes partial sums in parallel to arrive at a result sum. The parallel operation significantly improves the efficiency of summing a vector of numbers. In various embodiments, multiple vector units can operate in parallel to compute multiple results in parallel, significantly improving the throughput of channel convolution processor unit 400.

In some embodiments, the vector units of channel convolution processor unit 400 are arranged according to a partition of a convolution data input matrix that includes multiple portions of the convolution data input matrix. The vector units are configured to have a set of vector units to process each portion of the partition. For example, a partition with four portions includes four sets of vector units. In the example shown, channel convolution processor unit 400 can be configured such that vector units 401, 441, and 481 belong to a first set, vector units 411, 451, and 483 belong to a second set, vector units 421, 461, and 485 belong to a third set, and vector units 431, 471, and 487 belong to a fourth set. Each set of vector units includes as many vector units, with additional vector units represented by the ellipses, as there are channels to process concurrently. In some embodiments, the output of each vector unit, such as vector units 401, 411, 421, 431, 441, 451, 461, 471, 481, 483, 485, and 487, is a channel convolution result data element. The vector of outputs from each set of vector units corresponds to a vector output of the corresponding portion of the partition. In this manner, the vector units of channel convolution processor unit 400 are used to determine multiple channel convolution result data elements for multiple portions of a partition in parallel. By processing different portions of an activation data input matrix, channel convolution processor unit 400 determines channel convolution result data elements for multiple portions of a channel convolution result matrix in parallel. In various embodiments, the weight input arguments to the vector units may be reused across different data input arguments resulting in a significant efficiency and performance improvement. In some embodiments, only a single set of weight input arguments is received by channel convolution processor unit 400. Since each corresponding channel of each portion of the partition receives the same weight matrix, in some embodiments, weight input arguments are broadcasted to each corresponding vector unit of each portion. For example, when processing a 32-channel partition with four portions, instead of receiving four sets of 32 weight input arguments corresponding to 32 weight matrices, only a single set of 32 weight input arguments is received. Each of the 32 weight input arguments is broadcasted to four different vector units based on the channel of the convolution data input argument.

In various embodiments, once a channel convolution data element result is determined, channel convolution processor unit 400 may push the result to memory or another location such as a downstream processing component. For example, the vector results may be first written to an output unit such as output unit 151 of FIG. 1 where the results can then be transmitted to a downstream processing component or memory. In some embodiments, channel convolution processor unit 400 writes out entire vectors of results corresponding to a result for each vector unit and a result vector for each set of vector units. For example, a channel convolution processor unit that processes four portions of a partition of a convolution data input matrix concurrently can write out four vector results, one corresponding to each portion of the partition. In various embodiments, the results are written to memory such as memory 161 of FIG. 1 using a channel-first layout format. By determining results in the same format as the layout used to write the results to memory, significant performance benefits are achieved.

Figure 5:
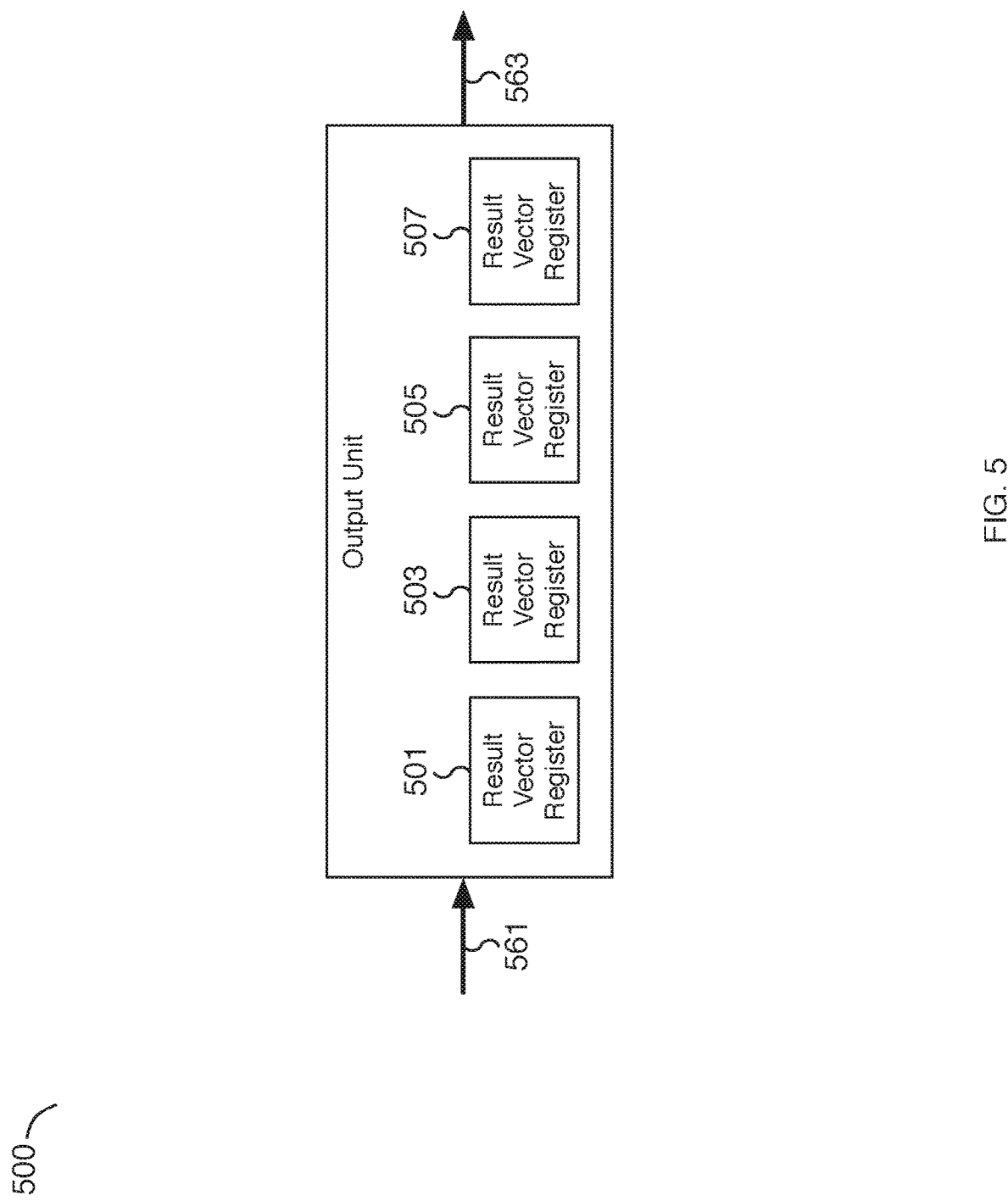
FIG. 5 is a block diagram illustrating an embodiment of an output unit for receiving channel convolution results.

FIG. 5 is a block diagram illustrating an embodiment of an output unit for receiving channel convolution results. Output unit 500 includes multiple result vector registers such as result vector registers 501, 503, 505, and 507. Output unit 500 receives channel convolution results via connection 561 and transmits channel convolution results downstream via connection 563. In some embodiments, connections 561 and/or 563 are multi-element wide communication/data buses and/or data lines. In some embodiments, connection 561 communicatively connects output unit 500 to a channel convolution processor unit such as channel convolution processor unit 107 of FIG. 1 and/or channel convolution processor unit 400 of FIG. 4 and connection 563 communicatively connects output unit 500 to memory such as memory 161 of FIG. 1. For example, channel convolution data element results of different portions of a partition of a convolution data input matrix may be received from a partition channel convolution processor unit via connection 561, processed and/or stored by output unit 500 by portion as vector results, and written to memory as channel convolution result matrix elements via connection 563. In some embodiments, the channel convolution results are received as convolution result vectors corresponding to different portions of a convolution data input matrix and stored at output unit 500 in result vector registers. In some embodiments, connection 563 communicatively connects output unit 500 to a downstream processing component and/or bus (not shown) other than and or in addition to memory.

In some embodiments, each result vector register of output unit 500, such as result vector registers 501, 503, 505, and 507, stores a vector of channel convolution result data elements corresponding to a portion of a partition of a convolution data input matrix. In the example shown, output unit 500 can store vector results for a partition with four portions. In some embodiments, the number of result vector registers of output unit 500 corresponds to the number of portions of a partition that a channel convolution processor unit can process concurrently. For example, an output unit can be configured with seven result vector registers if the upstream channel convolution processor unit can process seven portions of a convolution data input matrix concurrently. In various embodiments, output unit 500 can be configured with a corresponding number of result vector registers as appropriate. In some embodiments, output unit 500 is output unit 151 of FIG. 1.

In some embodiments, the length of each result vector register corresponds to the number of weight matrices that can be processed in parallel by the upstream channel convolution processor unit with corresponding channels of an activation data input matrix. In some embodiments, the length of each result vector register may be based on the cache line size or a multiple of the cache line size. For example, a 32-element cache line and a 32-element result vector register allow an entire cache line of channel convolution result data elements corresponding to different channels to be written to memory in cache aligned writes. In various embodiments, the channel convolution result data elements are stored in a channel-first layout format in result vector registers that allows for very efficient memory access when performing cache-line sized writes.

Figure 6:
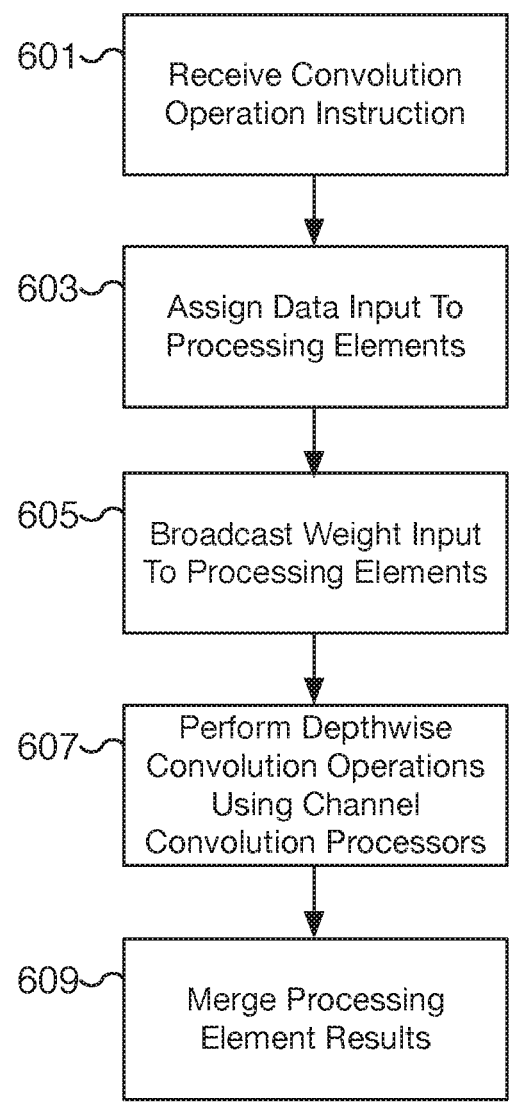
FIG. 6 is a flow chart illustrating an embodiment of a process for performing a three-dimensional convolution operation using a channel convolution processor.

FIG. 6 is a flow chart illustrating an embodiment of a process for performing a three-dimensional convolution operation using a channel convolution processor. For example, an artificial intelligence problem is solved using a neural network in part by analyzing one or more layers of a neural network by solving one or more three-dimensional convolution operations. A three-dimensional convolution operation may be initiated by issuing a convolution operation instruction and specifying the appropriate three-dimensional activation data input matrix and corresponding weight matrices. Parts of the convolution operation corresponding to different partitions and portions of the three-dimensional activation data input matrix and associated weight matrices can be assigned and performed by different processing elements. The performance can be significantly improved by distributing the workload across different processing elements. Each processing element receives a corresponding part of the three-dimensional activation data input matrix and associated weight matrices. In some embodiments, the same weight matrices are used by multiple different processing elements and the weight matrices are broadcasted to the applicable processing elements to improve memory bandwidth efficiency. At each processing element, a channel convolution processor unit is utilized for performing depthwise convolution operations on the assigned parts of the activation data and weight convolution input arguments. For example, each processing element can process an instruction indicating a part of an activation data input matrix and corresponding weight matrices to perform depthwise convolution operations. The instruction for a particular processing element can specify the location of the assigned parts of the activation data input matrix and the corresponding weight matrices in memory or another location. In some embodiments, the parts are processed by each processing element as partitions and portions of each partition. For example, the assigned part of an activation data input matrix can be subdivided into multiple partitions where each partition includes multiple portions. In some embodiments, the processing element processes the assigned part of the activation data input matrix over a number of iterations or cycles. For each iteration or cycle, a processing element can perform convolution operations on a partition that includes multiple portions of the activation data input matrix. For each new iteration, the processing element processes a different partition of the assigned part of the activation data input matrix until processing on the entire part is complete.

In some embodiments, the convolution operations are performed using a processing element such as processing element 101 of FIG. 1 and in particular using a channel convolution processor unit such as channel convolution processor unit 107 of FIG. 1 and/or channel convolution processor unit 400 of FIG. 4. In some embodiments, a data input unit and a weight input unit prepare the convolution input arguments for the channel convolution processor unit. In some embodiments, the data input unit is data input unit 103 of FIG. 1 and/or data input unit 200 of FIG. 2 and the weight input unit is weight input unit 105 of FIG. 1 and/or weight input unit 300 of FIG. 3. In some embodiments, the results of each channel convolution processor unit are gathered at an output unit of the processing element such as output unit 151 of FIG. 1 and/or output unit 500 of FIG. 5.

At 601, a convolution operation instruction is received. For example, a convolution operation specifies a three-dimensional activation data input matrix or a part (or subset) of a three-dimensional activation data input matrix. The data may correspond to an image or another appropriate data set with width, height, and channel dimensions. The convolution operation also specifies a set of filters such as a set of two-dimensional weight matrices for applying to the specified activation data. The two-dimensional weight matrices are all sized the same and may be 3×3 matrices although another size can be appropriate as well. In various embodiments, the number of weight matrices equals the channel depth of the activation data. In some embodiments, the convolution operation is expressed as one or more instructions, such as one or more convolution operation instructions received by a processing system. In various embodiments, the processing system can include one or more processing elements, where each processing element includes a channel convolution processor unit, a data input unit, a weight input unit, and an output unit.

At 603, data input is assigned to processing elements. For example, different three-dimensional parts and corresponding partitions of the specified activation data are assigned to different processing elements. Each of the processing elements is assigned to process its corresponding partitions of the three-dimensional activation data input matrix. By distributing the workload across multiple processing elements, the performance of the convolution operation is improved as parts of the convolution operation corresponding to the different assigned partitions of the activation data are processed in parallel. For each assigned partition of the data input, there exists a corresponding set of weight matrices. The assigned data is transmitted to the appropriate processing elements. In various embodiments, each partition includes multiple portions of the activation data, where each portion has dimensions that correspond to the corresponding set of weight matrices.

At 605, weight input is broadcasted to processing elements. The appropriate weight input corresponding to the assigned portions of the specified activation data is transmitted to the corresponding processing elements. In various embodiments, processing elements assigned to activation data from the same channels utilize the same weight input and the same weight input is broadcasted to the corresponding processing elements. By utilizing a broadcast instead of individual transmissions, the resources required to load the processing elements with the appropriate weight input are reduced and a significant performance improvement is achieved.

At 607, depthwise convolution operations using channel convolution processors are performed. For example, each processing element processes its assigned partitions of the three-dimensional activation data input matrix with the appropriate weight matrices using a channel convolution processor unit. In various embodiments, each processing element loads its channel convolution processor unit with input activation data processed by a data input unit and weight data processed by a weight input unit. The channel convolution processor unit performs depthwise convolution on the assigned partitions and channels of the activation data to determine corresponding channel convolution result data elements. After an initial partition of the assigned data is processed, the processing element iterates until all remaining assigned data is processed. In various embodiments, the weight input is loaded into the channel convolution processor unit of each processing element only once even as additional activation data is incrementally loaded. The results from performing depthwise convolution operations using the channel convolution processors correspond to data elements of a channel convolution result matrix. In some embodiments, each processing element gathers its results at an output unit of the processing element. The results can then be transmitted to another memory location (and/or component) outside of the processing element.

At 609, processing element results are merged. For example, results from each processing element determined at step 607 are written to memory such as memory 161 of FIG. 1. The channel convolution result data elements determined at step 607 are merged to create a channel convolution result matrix. In various embodiments, each processing element writes its results to memory and the final channel convolution result matrix is stored in memory. In some embodiments, the channel convolution result matrix is stored in another location such as a local memory cache and used as an input activation data matrix for a subsequent matrix and/or convolution operation.

Figure 7:
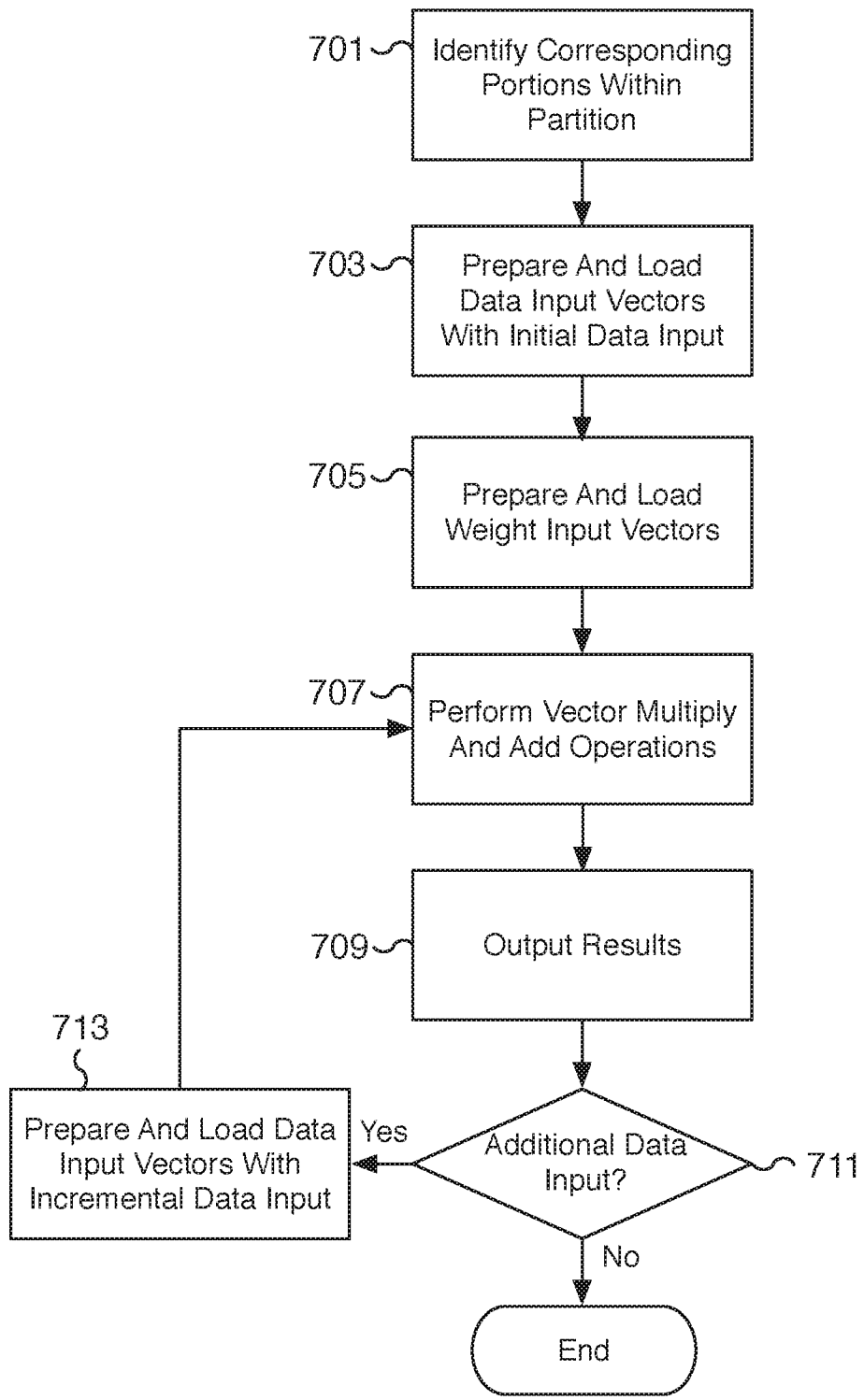
FIG. 7 is a flow chart illustrating an embodiment of a process for performing depthwise convolution using a channel convolution processor.

FIG. 7 is a flow chart illustrating an embodiment of a process for performing depthwise convolution using a channel convolution processor. For example, data input vectors are loaded into vector units of a channel convolution processor along with weight input vectors to determine channel convolution result data element results. Each data input vector is a two-dimensional sub-matrix of a portion of a three-dimensional activation data input matrix. Each weight input vector is a two-dimensional weight matrix associated with a channel of the three-dimensional activation data input matrix. Each vector unit performs a dot product result to determine a channel convolution result data element result. In various embodiments, once an initial set of data input and the corresponding weight input matrices are loaded into vector units of the channel convolution processor, subsequent partitions of the activation data input matrix are processed by only loading incremental parts of the activation data input matrix. The weight input matrices and data elements of the data input used to determine the previous convolution results are reused with improved efficiency and performance benefits.

In some embodiments, the process of FIG. 7 is performed as part of the process of FIG. 6. For example, in some embodiments, the steps 701, 703, and/or 713 are performed at 603 of FIG. 6, the step 705 is performed at 605 of FIG. 6, and the steps 707 and 709 are performed at 607 and/or 609 of FIG. 6. In some embodiments, the process of FIG. 7 is performed using a processing element such as processing element 101 of FIG. 1 and a partition channel convolution processor unit such as channel convolution processor unit 107 of FIG. 1 and/or channel convolution processor unit 400 of FIG. 4. In some embodiments, the data input and weight input for the vector units of the channel convolution processor unit are prepared by a data input unit and weight input unit, respectively, and the channel convolution results are gathered at an output unit. In some embodiments, the data input unit is data input unit 103 of FIG. 1 and/or data input unit 200 of FIG. 2, the weight input unit is weight input unit 105 of FIG. 1 and/or weight input unit 300 of FIG. 3, and the output unit is output unit 151 of FIG. 1 and/or output unit 500 of FIG. 5.

At 701, three-dimensional sub-matrix portions of a partition of the three-dimensional activation data input matrix are identified. For example, a partition of a three-dimensional activation data input matrix is made up of multiple sub-matrix portions, where each portion is a three-dimensional sub-matrix associated with corresponding two-dimensional weight matrices for performing convolution operations. Both the partition and included portions share the same channel depth. The portions of the partition are identified for determining the relevant sub-matrices used to perform convolution operations with the corresponding weight matrices. For example, using 32-channels and 3×3 weight matrices, four different 3×3×32 portions of a 6×3×32 partition are identified. Although 32-channels are used in the example, in various embodiments, a different number of channels is applicable. Similarly, different weight matrix dimensions and number of portions in a partition can be supported as well.

At 703, data input vectors are prepared with an initial set of data input and loaded to vector units of a channel convolution processor unit. For example, data elements corresponding to a subset of a three-dimensional activation data input matrix are prepared as data input vectors for the initial set of data input. In various embodiments, the initial set of data input requires loading each data element of a partition. In some embodiments, each data input vector corresponds to a two-dimensional sub-matrix or matrix slice of the activation data input matrix for a particular channel. Moreover, each specific partition can include multiple portions made up of two-dimensional sub-matrices or matrix slices for every channel. The number of data input vectors for each portion corresponds to the channel depth of the activation data input matrix partition. In various embodiments, the total number of data input vectors prepared matches the number of vector units of the channel convolution processor unit. In some embodiments, the vector units are allocated to different portions of a partition and add up to the number of channel convolution result data elements that can be processed in parallel. For example, in the event 32 channels are processed in parallel, 32 data input vectors are prepared for each portion of the partition. In the event a partition includes four portions, 128 data input vectors are loaded into 128 different vector units of the channel convolution processor unit. In some embodiments, each matrix stored in a data input vector is a 3×3 matrix and matches the size of a corresponding weight matrix. In various embodiments, the size of the matrices may be another size, such as 5×5, 7×7, 9×9, 11×11 or another appropriate size. The size of each data input vector is based on the size of the matrix and is the number of elements of the matrix. For example, for a 3×3 matrix, each data input vector has 9 data elements and the vector unit can process 9 data elements to go along with 9 weight elements. As another example, for a 5×5 matrix, each data input vector has 25 data elements and the vector unit can process 25 data elements to go along with 25 weight elements.

In various embodiments, once prepared, each data input vector is loaded to an appropriate vector unit of the channel convolution processor unit. For example, each vector unit of the channel convolution unit is loaded with a prepared data input vector. The elements of the prepared data input vector correspond to a sub-matrix from a single channel of a portion of the activation data input matrix. In various embodiments, the corresponding data elements of each data input vector for a portion of a partition each have the same width and height location in the activation data input matrix but have different channel locations. In addition to the data input vector, each vector unit receives a corresponding weight input vector at 705.

At 705, weight input vectors are prepared and loaded to vector units of a channel convolution processor unit. For example, weight data elements corresponding to a set of weight matrices associated with each portion of a three-dimensional activation data input matrix partition are prepared as weight input vectors. In various embodiments, the weight elements associated with the initial set of activation data input requires loading each weight data element to the corresponding vector units. In some embodiments, processing of subsequent additional activation data can reuse the same weight input data without additional processing to prepare new weight input vectors. In some embodiments, each weight input vector corresponds to a different two-dimensional weight matrix associated with a different channel of the activation data input matrix. The number of weight input vectors corresponds to the number of vector units of the channel convolution processor unit and is the number of channels multiplied by the number of portions of a partition that can be processed in parallel. For example, in the event a partition includes four portions and 32 channels of each portion are processed in parallel, 128 weight input vectors are prepared and one is loaded into each vector unit of the channel convolution processor unit. In some embodiments, the 128 weight input vectors are prepared by preparing a single set of 32 weight input vectors and broadcasting each of the 32 prepared weight input vectors to the corresponding vector unit assigned to each portion of the current partition. In some embodiments, each weight matrix stored in a weight input vector is a 3×3 weight matrix and matches the size of a corresponding activation data sub-matrix. In various embodiments, the size of the weight matrices may be another size, such as 5×5 weight matrices or another appropriate size. The size of each weight input vector is based on the size of the weight matrix and is the number of elements of the matrix. For example, for a 3×3 weight matrix, each weight input vector has 9 weight data elements and the vector unit can process 9 weight data elements to go along with 9 activation data elements. As another example, for a 5×5 weight matrix, each weight input vector has 25 weight data elements and the vector unit can process 25 weight data elements to go along with 25 activation data elements.

In various embodiments, once prepared, each weight input vector is loaded to an appropriate vector unit of the channel convolution processor unit based on the corresponding data input vector. For example, each vector unit of the channel convolution unit is loaded with a prepared weight input vector. The elements of the prepared weight input vector correspond to a weight matrix associated with a sub-matrix from a single channel of the activation data input matrix. In addition to the weight input vector, each vector unit receives a corresponding data input vector at 703.

At 707, vector multiply and vector add operations are performed. Utilizing the input vectors loaded from data input vectors at 703 or 713 and from weight input vectors at 705, each corresponding vector unit of a channel convolution processor unit performs vector multiply and add operations. Each element from a data input vector is multiplied by its corresponding element from a weight input vector. The result is a vector of multiplication results. For example, using 3×3 data and weight matrices, each one of nine data elements is multiplied against a corresponding one of nine weight elements to determine nine multiplication results. In some embodiments, the vector multiplication operation is performed by a vector multiply unit of a vector unit. Using the vector multiply result, a vector sum result is calculated by adding each of the elements from the vector of multiplication results. In various embodiments, the result is a channel convolution result data element of a channel convolution result matrix. In some embodiments, the sum is determined using a vector adder unit of the vector unit. For example, a vector adder unit using an adder tree can compute the sum of the vector elements. In some embodiments, each vector unit of a channel convolution processor unit performs a dot product operation using its corresponding loaded data input vector and weight input vector. The dot product result is a channel convolution result data element of a channel convolution result matrix. In various embodiments, channel convolution result data elements are determined for multiple portions of a partition in parallel.

In some embodiments, each vector unit performs its vector operations in parallel. For example, a channel convolution processor unit with 128 vector units can compute 128 convolution result data elements corresponding to 32 different channels for four different portions of a partition at least in part concurrently. In some embodiments, each vector unit group independently determines the results associated with its assigned convolution operation in parallel with the other vector units of other vector unit groups.

At 709, results are outputted. For example, a vector of channel convolution result data elements for each portion of a partition determined by performing the matrix multiply and add operations at 707 is outputted from the channel convolution processor unit. In various embodiments, the vector results are outputted as multiple output result vectors to an output unit such as output unit 151 of FIG. 1 and/or output unit 500 of FIG. 5. For example, a partition channel convolution processor unit capable of processing four portions of a partition concurrently can output four result vectors, one result vector associated with results for each portion of the partition. The output unit may be used to write the output result vectors to memory. In some embodiments, the results are outputted and used as an argument to a subsequent matrix operation.

At 711, a determination is made whether additional data input remains to be processed. For example, when traversing the assigned part of an activation data input matrix horizontally along the width dimension, a determination is made whether additional columns of the assigned part of an activation data input matrix exist. Similarly, when traversing vertically along the height dimension of the assigned part of an activation data input matrix, a determination is made whether additional rows exist. In the event additional data input of the assigned part of an activation data input matrix remains to be processed, processing proceeds to 713. In the event no additional data input remains to be processed, processing ends.

At 713, data input vectors using incremental data input are prepared and loaded to vector units of a channel convolution processor unit. For example, incremental data corresponding to the next column (or row) of data of the assigned part of an activation data input matrix is loaded. When traversing horizontally along the width dimension, an additional column of the assigned part of an activation data input matrix is loaded. Similarly, when traversing vertically along the height dimension, an additional row of the assigned part of an activation data input matrix is loaded. This incremental data is used along with data loaded from the previous iteration of 703 or 713 to prepare input data vectors that correspond to a new partition of the activation data input matrix. For example, when traversing vertically, data from the second and third rows of the previous iteration are shifted to the first and second rows and combined with the newly loaded third row to create new data input vectors. The new data input vectors correspond to shifting the sub-matrix slices of the different portions of the activation data input matrix partition vertically. In some embodiments, the new data input vectors correspond to sliding the relevant convolution matrix of the activation data along the height dimension. Similarly, when traversing horizontally, data from the second and third columns of the previous iteration are shifted to the first and second columns and combined with the newly loaded third column to create new data input vectors. The new data input vectors correspond to shifting the sub-matrix slices of the different portions of the activation data input matrix partition horizontally. In some embodiments, the new data input vectors correspond to sliding the relevant convolution matrix of the activation data along the width dimension. In various embodiments, only the initial set of data input requires loading an entire matrix of data elements and is performed at 703. At 713, only incremental data elements are needed.

In various embodiments, the new data input vectors corresponding to a new sub-matrix of the assigned activation data input matrix are loaded to the corresponding vector units. The existing weight input vectors can be reused since the relative channel dimensions have not changed. By only loading the new incremental activation data and reusing the weight data elements, significant performance improvements are achieved when performing the convolution operation.

Figure 8A:
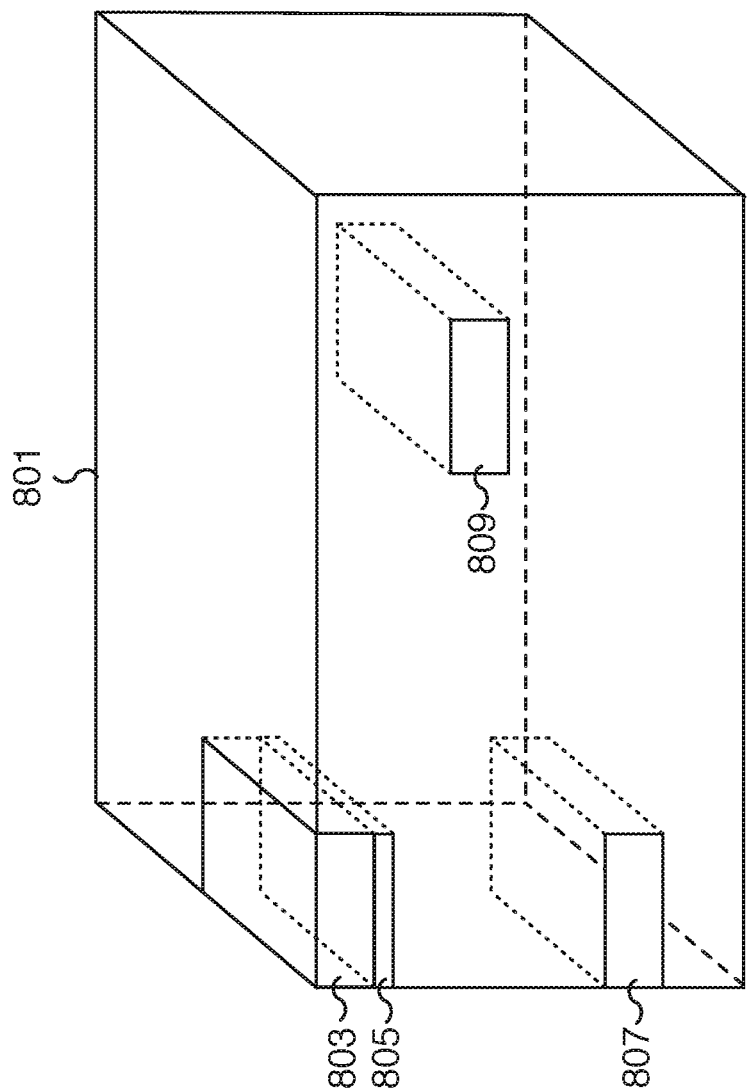
FIG. 8A is a diagram illustrating an example activation data input matrix for performing a convolution operation.

FIG. 8A is a diagram illustrating an example activation data input matrix for performing a convolution operation. In the example shown, three-dimensional activation data input matrix 801 includes three-dimensional partitions 803, 807, and 809. Partitions 803, 807, and 809 each include multiple portions, where each portion is a three-dimensional sub-matrix with dimensions compatible with a corresponding set of weight matrices. In some embodiments, a convolution operation is performed using activation data input matrix 801 with a group of two-dimensional weight matrices. In some embodiments, activation data input matrix 801 may be a part of a larger three-dimensional matrix (not shown). Activation data input matrix 801 includes width, height, and channel dimensions. The corresponding two-dimensional weight matrices may include as many weight matrices as there are channels for activation data input matrix 801.

In some embodiments, partitions of activation data input matrix 801 are assigned to a processing element for performing and distributing parts of the convolution operation.

For example, vertical or horizontal spans of partitions can be assigned to different processing elements to perform convolution operations using the processes of FIGS. 6 and/or 7. As one example, a group of partitions starting with partition 803 and including partitions traversing activation data input matrix 801 downward and vertically along the height dimension are assigned to a processing element. The group of partitions includes partitions 803 and 807, among others, but not partition 809. The group forms a vertical span of partitions that is assigned to a processing element. Another vertical span of partitions can be assigned to a different processing element. In various embodiments, the channel depth of a partition, such as partitions 803, 807, and 809, is based on the cache line size and may be a multiple of the cache line size to improve performance. When traversing activation data input matrix 801 vertically, the height of a partition is configured to match the height dimension of the corresponding weight matrices. The width of the partition can be larger than the width of the corresponding weight matrices and allows multiple three-dimensional portions of the partition to be processed concurrently. For example, a 6×3×32 sub-matrix partition of activation data input matrix 801 can be utilized for a system with a 32-element cache line and corresponding 3×3 weight matrices. In the example, the width dimension is 6 elements wide although another appropriate width corresponding to more or fewer portions in the partition can be utilized based on the channel convolution processor unit. In some embodiments, the partitions are arranged to traverse activation data input matrix 801 horizontally. In the event an activation data input matrix is traversed horizontally, the width of the partition matches the width dimension of the corresponding weight matrices and the height of the partition can be larger than the height of the corresponding weight matrices. In various embodiments, the partition is made up of multiple three-dimensional portions that correspond to the weight matrices. For example, a 6×3×32 partition includes four 3×3×32 portions when utilizing a stride of 1. In the examples herein, a stride of 1 is utilized to describe the disclosed techniques although alternative stride values can be applied as appropriate. In various embodiments, different stride parameters such as stride of 2, 3, 4, or another appropriate value may be utilized and each partition will include a different appropriate number of portions.

In some embodiments, the number of channels associated with the assigned partitions is based on the number of portions within the partition and the number of vector units of the channel convolution processor unit assigned/available to process each portion. For example, a channel convolution processor unit with 128 vector units can process a three-dimensional partition of activation data input matrix 801 that includes four portions and 32 channels. The channel depth for the partition and the portions of the partition match. For example, three-dimensional partitions 803, 807, and 809 may each have the dimensions 6×3×32. Each of partitions 803, 807, and 809 includes four portions where each portion has dimensions 3×3×32. In some embodiments, partitions 803, 807, and 809 each represent the data elements a channel convolution processor unit can process during one iteration (or cycle). A subsequent iteration (or cycle) processes an additional column (or row) of data elements by sliding the three-dimensional sub-matrices used as convolution arguments vertically (or horizontally) along the height (or width) dimension of activation data input matrix 801 but keeping the same channels. In the example shown, activation data input matrix 801 is traversed vertically along the height dimension.

In some embodiments, slice 805 corresponds to a row of a partition that is processed by a processing element after partition 803 is processed. In various embodiments, to process a new partition after partition 803, only the data elements of slice 805 are needed. The remaining data elements of the new partition can be reused and are a part of partition 803. For example, in the event partition 803 is a 6×3×32 partition and slice 805 is a 6×1×32 slice, the second two rows of partition 803 combined with a third row using slice 805 make up the new partition. Thus, when traversing a span of partitions down (or across) an activation data input matrix, only incremental data elements are needed. Although the example of FIG. 8A demonstrates traversing an activation data input matrix vertically using partitions that are wider than they are tall, in various embodiments, an activation data input matrix can be traversed in a different dimension such as horizontally along the width dimension using partitions that are taller than they are wide.

In the example shown, partitions 803, 807, and 809 are just three examples of the possible convolution arguments to a partition channel convolution processor unit. In some embodiments, partition 803 represents an initial set of data input to a channel convolution processor unit of a processing element and partition 807 represents a subsequent set of data input for the same processing element. Since partition 809 is part of a different vertical span of partitions than the span that includes partitions 803 and 807, partition 809 represents a subsequent set of data input assigned to a different processing element. In some embodiments, for the assigned processing element, the different portions of partition 803 are identified at 701 of FIG. 7, the data elements of partition 803 are prepared at 703 of FIG. 7, and partition 807 is prepared at 713 of FIG. 7. In some embodiments, slice 805 is the incremental data input loaded at 713 of FIG. 7. Similarly, in some embodiments, partition 809 is prepared at 713 of FIG. 7 by a potentially different processing element. In various embodiments, the processing element is a processing element such as processing element 101 of FIG. 1.

In various embodiments, the partitions 803, 807, and 809 are prepared as arguments for a channel convolution processor unit by a data input unit such as data input unit 103 of FIG. 1 and/or data input unit 200 of FIG. 2. Each channel of a sub-matrix portion of the partitions 803, 807, and 809 may be converted by the data input unit into a corresponding data input vector by linearizing the two-dimensional matrix for a particular channel into a one-dimensional vector for a vector unit of the channel convolution processor unit. In various embodiments, activation data input matrix 801 and partitions 803, 807, and 809 are stored using a channel-first layout and partitions 803, 807, and 809 are retrieved using channel-first layout memory reads. For example, the data element at width, height, and channel location (1,1,1) of a partition is stored adjacent to the data element at width, height, and channel location (1,1,2) of the same partition and the two data elements can be read together with a single memory read and/or cache line memory read. For a 32-data element cache line, data elements (1,1,1) through (1,1,32) can be read in a single memory read. A subsequent read can load the data elements at width, height, and channel location (1,2,1) through (1,2,32) of the same partition. In various embodiments, each memory read stores the corresponding data elements in a data input vector register such as data input vector register 201, 203, 205, 207, 209, 211, 221, 223, 225, 227, 229, 231, 241, 243, 245, 247, 249, or 251 of FIG. 2. Once the data elements are loaded from memory, the corresponding elements of the same channel of a portion of a partition can be prepared into a data input vector.

Figure 8B:
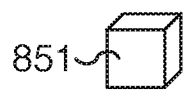
FIG. 8B is a diagram illustrating an example group of weight matrices for performing a convolution operation.
Figure 8B:
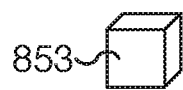
Figure 8B:
Figure 8B:
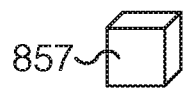
Figure 8B:
Figure 10A:
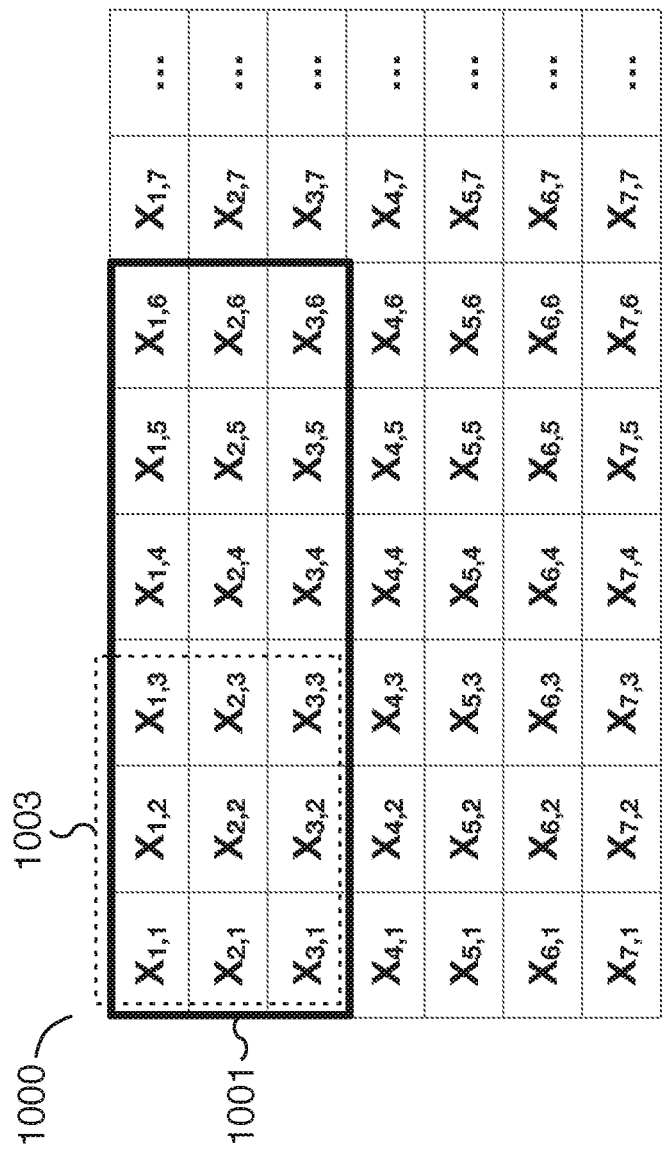
Figure 10C:
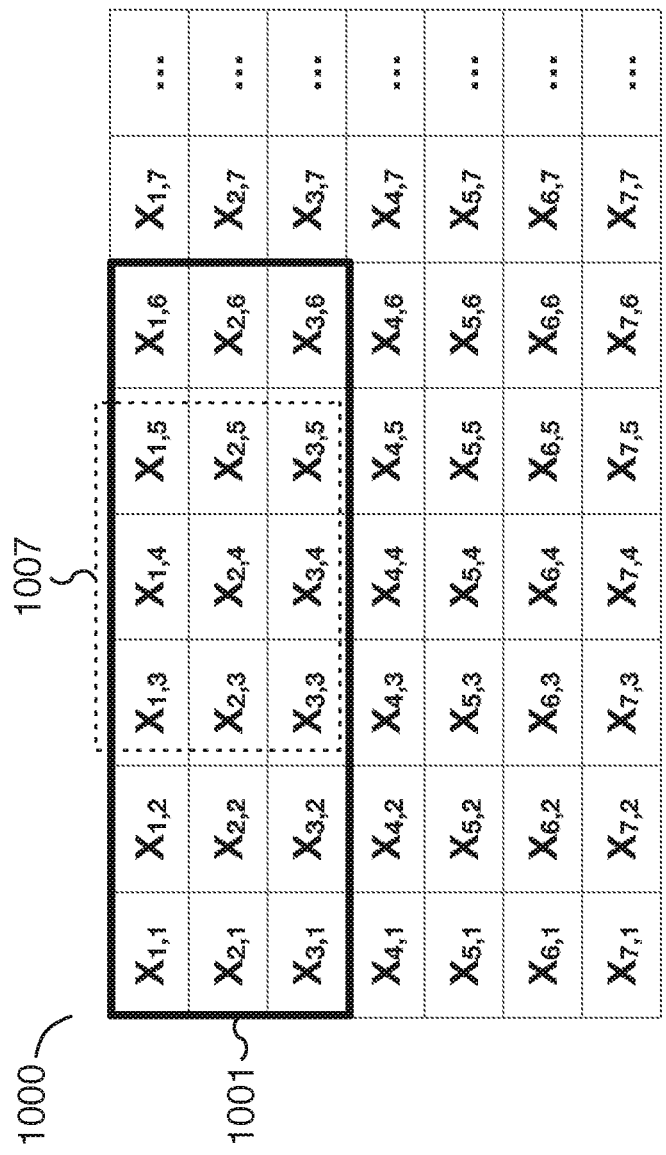

FIG. 8B is a diagram illustrating an example group of weight matrices for performing a convolution operation. In the example shown, two-dimensional weight matrices 851, 853, 855, 857, and 859 make up a group of weight matrices for performing a convolution operation with an activation data input matrix such as activation data input matrix 801 of FIG. 8A. The total number of weight matrices may match the channel dimension of the applicable activation data input matrix. A subset of the weight matrices, matching in number to the channel depth of a partition, such as partitions 803, 807, and 809 of FIG. 8A, is utilized as the corresponding convolution weight matrices for a channel convolution processor unit. In the example shown, the width and height dimensions of each weight matrix 851, 853, 855, 857, and 859 match the width and height dimensions of each three-dimensional portion of an activation data matrix partition. For example, in some embodiments, each of 32 two-dimensional weight matrices has dimensions 3×3×1 to go along with a portion of an activation data matrix partition where each portion corresponds to a three-dimensional convolution data matrix with dimensions 3×3×32.

In various embodiments, the weight matrices 851, 853, 855, 857, and 859 are prepared as arguments for a channel convolution processor unit by a weight input unit such as weight input unit 105 of FIG. 1 and/or weight input unit 300 of FIG. 3. Each weight matrix may be converted by the weight input unit into a corresponding weight input vector by linearizing the two-dimensional weight matrix into a one-dimensional vector for a vector unit of the channel convolution processor unit. In various embodiments, weight matrices 851, 853, 855, 857, and 859 are stored and retrieved using a depth-first layout. For example, the data elements at width and height location (1,1) of weight matrices 851, 853, 855, 857, and 859 are stored adjacent to one another and can be read together with a single memory read and/or cache line memory read. A subsequent read can load the data elements at width and height location (1,2) of the weight matrices 851, 853, 855, 857, and 859. In various embodiments, each memory read stores the corresponding data elements in a weight input vector register such as weight input vector register 301, 303, 305, 311, 313, 315, 321, 323, or 325 of FIG. 3. Once the data elements are loaded from memory, the corresponding elements of the same weight matrix can be prepared as a weight input vector. The data elements of weight matrix 859 may be separated from the data elements of weight matrices 851, 853, 855, and 857 by any number of additional weight matrices.

Figure 9:
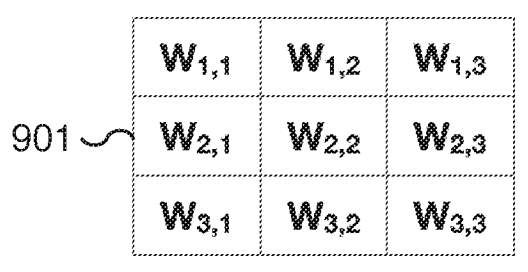

FIG. 9 is a diagram illustrating an example weight matrix for performing a channel convolution operation. In FIG. 9, weight matrix 901 represents an exemplar 3×3 matrix of weight elements. Other dimensions for a weight matrix may be appropriate as well, such as 1×1, 5×5, 7×7, 9×9, etc. In the example shown, the subscripts associated with each weight element use a row and column notation with initial offsets starting at 1. For the first row of weight matrix 901, $W_{1,1}$ is the weight element located at column 1, $W_{1,2}$ is the weight element located at column 2, and $W_{1,3}$ is the weight element located at column 3. In various embodiments, weight matrix 901 is one of the weight matrices 851, 853, 855, 857, or 859 of FIG. 8B.

In some embodiments, weight matrix 901 is an input convolution matrix argument for performing a channel convolution operation and is prepared by a weight input unit such as weight input unit 105 of FIG. 1 and/or weight input unit 300 of FIG. 3. Once prepared, the weight data elements of weight matrix 901 are loaded to one or more vector units of a channel convolution processor unit. For example, a weight input unit can prepare weight matrix 901 as a weight input vector that is loaded as one vector operand to a vector unit of a channel convolution processor unit. In some embodiments, the channel convolution processor unit is channel convolution processor unit 107 of FIG. 1 and/or channel convolution processor unit 400 of FIG. 4 and a channel convolution is performed using the processes of FIGS. 6 and/or 7.

FIGS. 10A-D are diagrams illustrating a single channel of an example activation data input matrix for performing a channel convolution operation. The dimensions of activation data input matrix 1000 are larger than its corresponding weight matrix such as weight matrix 901 of FIG. 9. In the example of FIGS. 10A-D, only rows and columns 1-7 and a single channel of activation data input matrix 1000 are shown. The width and height of activation data input matrix 1000 can extend past the depicted rows and columns and activation data input matrix 1000 includes multiple channels (not shown). In the example shown, the subscripts associated with each data element of activation data input matrix 1000 use a row and column notation with initial offsets starting at 1. The channel dimensions are not shown and each data element of activation data input matrix 1000 shares the same channel dimension.

In the example of FIGS. 10A-D, partition 1001 is a sub-matrix of activation data input matrix 1000. In some embodiments, activation data input matrix 1000 is a two-dimensional slice corresponding to a single channel of activation data input matrix 801 of FIG. 8A and partition 1001 is a corresponding two-dimensional slice of the same channel of partition 803 of FIG. 8A. Partition 1001 has width and height dimensions 6×3 and matches the height of a corresponding weight matrix such as weight matrix 901 of FIG. 9. Partition 1001 includes four sub-matrix portions 1003, 1005, 1007, and 1009 that each have dimensions 3×3 and match the dimensions of a corresponding weight matrix such as weight matrix 901 of FIG. 9. In the examples of FIGS. 10A-D, a stride of 1 is utilized although a different stride value and a corresponding different number of sub-matrix portions of a partition can be appropriate as well. In various embodiments, partition 1001 and portions 1003, 1005, 1007, and 1009 are data elements from a single channel of corresponding multi-channel three-dimensional sub-matrices. In some embodiments, sub-matrix portions 1003, 1005, 1007, and 1009 are each paired with the same weight matrix, such as weight matrix 901 of FIG. 9, as convolution matrix arguments. For example, a single vector unit of a channel convolution processor unit can process an activation data sub-matrix portion with a corresponding weight matrix using the techniques described herein. To process sub-matrix portions 1003, 1005, 1007, and 1009, four vector units are utilized to process all four portions at least in part concurrently.

In some embodiments, each sub-matrix portion of partition 1001 that includes sub-matrix portions 1003, 1005, 1007, and 1009 is an input convolution matrix argument for performing a channel convolution operation and is prepared by a data input unit such as data input unit 103 of FIG. 1 and/or data input unit 200 of FIG. 2. Once prepared, the data elements of a sub-matrix portion are loaded to a vector unit of a channel convolution processor unit. For example, a data input unit can prepare sub-matrix portion 1003 as a data input vector that is loaded as one vector operand to a vector unit of a channel convolution processor unit. The data input unit also prepares sub-matrix portion 1005 as a data input vector that is loaded as one vector operand to a second vector unit of the channel convolution processor unit. Similarly, sub-matrix portion 1007 and sub-matrix portion 1009 are prepared as data input vectors and loaded to different vector units of the channel convolution processor unit. By processing multiple portions of a partition, such as portions 1003, 1005, 1007, and 1009 of partition 1001, at least in part concurrently, activation data input matrix 1000 is traversed horizontally within each partition. Between partition iterations, new partitions of activation data input matrix 1000 are selected and processed by traversing activation data input matrix 1000 vertically. In this manner, an activation data input matrix is traversed along two-dimensions for the same set of channels resulting in significant performance improvements and efficiency gains. In some embodiments, the channel convolution processor unit is channel convolution processor unit 107 of FIG. 1 and/or channel convolution processor unit 400 of FIG. 4 and a channel convolution is performed using the processes of FIGS. 6 and/or 7.

FIGS. 11A-D are diagrams illustrating an example of vector computations for performing channel convolution operations on a partition of an activation data input matrix. Each of FIGS. 11A-D illustrate the vector computations for a different one of four portions of an activation data input matrix partition with the same weight input matrix. In the examples of FIGS. 11A-D, weight input vectors 1101, 1111, 1121, and 1131 and data input vectors 1103, 1113, 1123, and 1133 each include nine data elements. Weight input vectors 1101, 1111, 1121, and 1131 correspond to a 3×3 weight matrix. Data input vectors 1103, 1113, 1123, and 1133 each correspond to a 3×3 matrix of a portion of a partition. In some embodiments, weight input vectors 1101, 1111, 1121, and 1131 correspond to a linearized version of weight matrix 901 of FIG. 9 and data input vectors 1103, 1113, 1123, and 1133 correspond to linearized versions of sub-matrix portion 1003 of FIG. 10A, 1005 of FIG. 10B, 1007 of FIG. 10C, and 1009 of FIG. 10D, respectively. Each weight input vector and data input vector pair of FIGS. 11A-D are examples of two input vectors loaded into a vector unit of a channel convolution processor unit for performing vector operations to determine a channel convolution result data element. In some embodiments, the vector units are vector units 111, 121, 131, or 141 of FIG. 1 and/or vector units 401, 411, 421, 431, 441, 451, 461, 471, 481, 483, 485, or 487 of FIG. 4. In various embodiments, each of the vector units of a channel convolution processor unit is loaded with a corresponding pair of input vectors. The input vector pairs of FIGS. 11A-D correspond to four two-dimensional sub-matrix portions of a partition of an activation data input matrix assigned to a particular processing element and each portion's corresponding weight matrix. Although the partition in the example includes four portions, a partition can be configured with a different number of portions as appropriate.

In the example shown, FIGS. 11A-D include computation cells 1105, 1115, 1125, and 1135. Each computation cell illustrates the equivalent vector computations performed by a vector unit of a channel convolution processor unit with the corresponding weight input vector and data input vector pair as input vectors. For example, the vector computation result shown in computation cell 1105 is the result determined by multiplying each element of weight input vector 1101 against a corresponding element of data input vector 1103. Similarly, the vector computation result shown in computation cell 1115 is the result determined by multiplying each element of weight input vector 1111 against a corresponding element of data input vector 1113. The vector computation result shown in computation cell 1125 is the result determined by multiplying each element of weight input vector 1121 against a corresponding element of data input vector 1123, and the vector computation result shown in computation cell 1135 is the result determined by multiplying each element of weight input vector 1131 against a corresponding element of data input vector 1133.

Figure 11A:
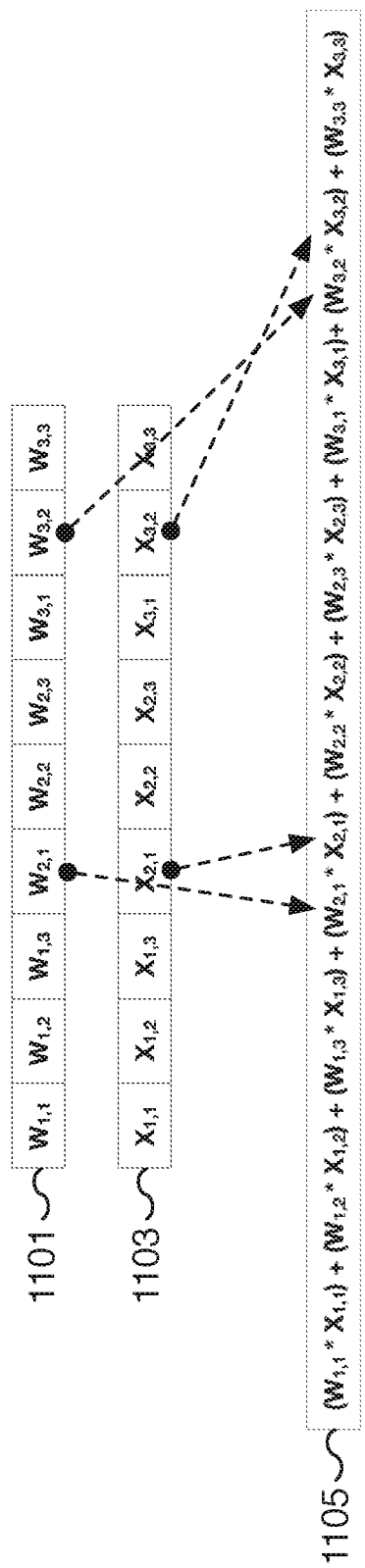
FIGS. 11A-D are diagrams illustrating an example of vector computations for performing channel convolution operations on a partition of an activation data input matrix.
Figure 11B:
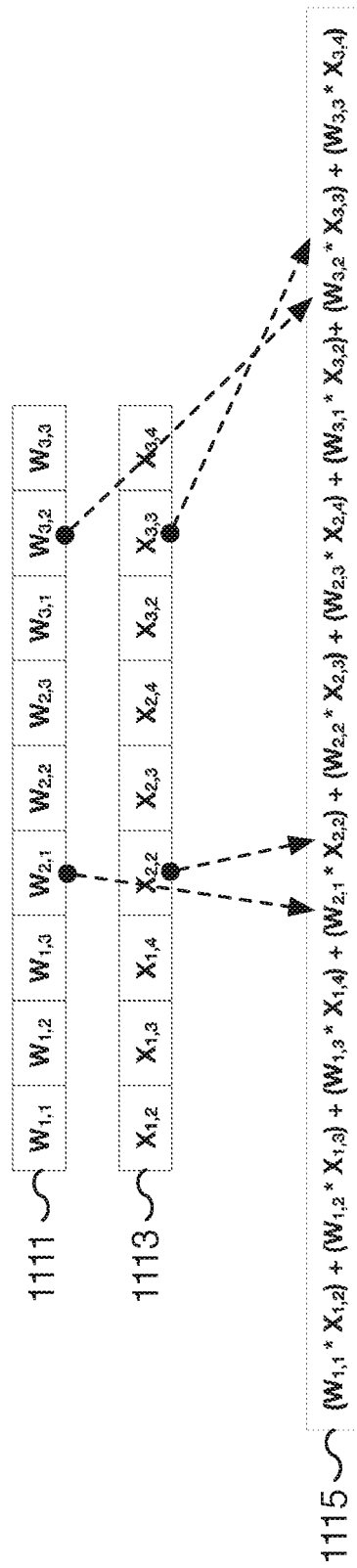
Figure 11C:
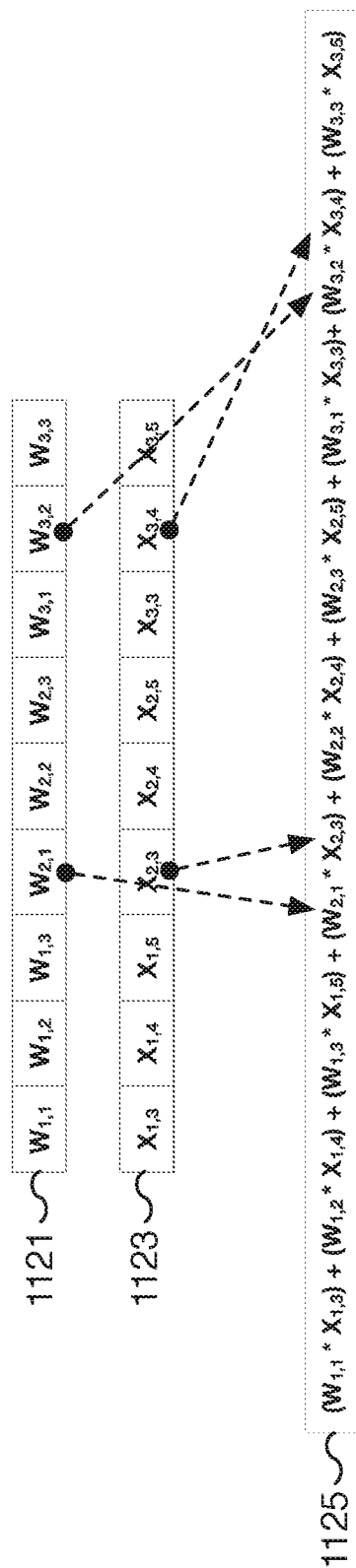
Figure 11D:
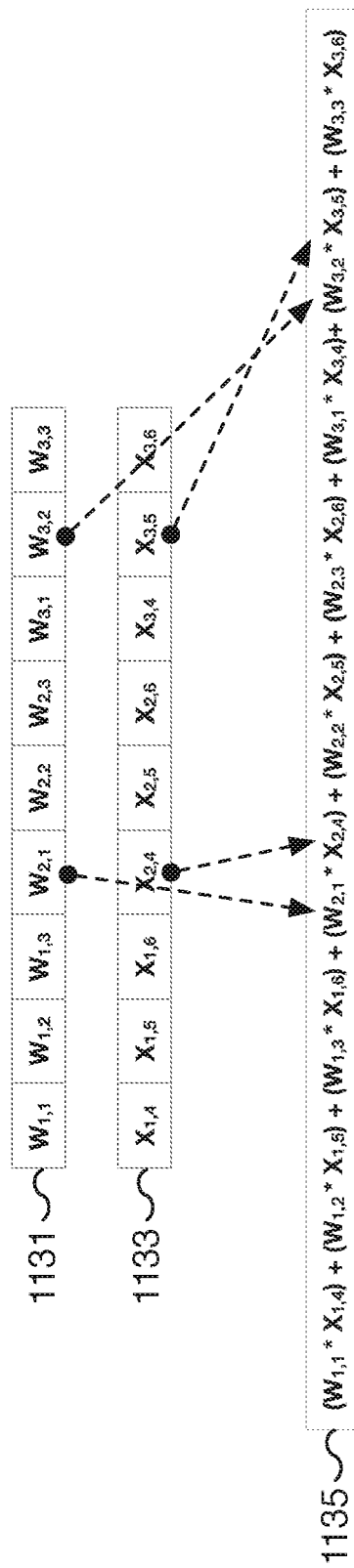

The nine elements from each weight input vector 1101, 1111, 1121, and 1131 are multiplied against the nine elements of each corresponding data input vector 1103, 1113, 1123, and 1133, respectively, to determine nine multiplication results. In the example shown, each of computation cells 1105, 1115, 1125, and 1135 includes the nine multiplication terms corresponding to the nine multiplication results. The arrows in FIGS. 11A-D originating from a weight input vector element or data input vector element and pointing to computation terms of a computation cell call out two of the nine multiplication results and their corresponding operands as examples. In FIG. 11A, the arrows show that weight element $W_{2,1}$ is multiplied with corresponding data element $X_{2,1}$ to determine a multiplication result ($W_{2,1}*X_{2,1}$) and that weight element $W_{3,2}$ is multiplied with corresponding data element $X_{3,2}$ to determine a multiplication result ($W_{3,2}*X_{3,2}$). In FIG. 11D, the arrows show that weight element $W_{2,1}$ is multiplied with corresponding data element $X_{2,4}$ to determine a multiplication result ($W_{2,1}*X_{2,4}$) and that weight element $W_{3,2}$ is multiplied with corresponding data element $X_{3,5}$ to determine a multiplication result ($W_{3,2}*X_{3,5}$). Similar examples are called out by the arrows in FIGS. 11B and 11C.

In some embodiments, the multiplication shown in computation cells 1105, 1115, 1125, and 1135 is performed using a vector multiply unit such as vector multiply unit 403, 413, 423, 433, 443, 453, 463, or 473 of FIG. 4. In some embodiments, the multiplication results are fed as a vector into a vector adder unit to compute the sum of the multiplication results. The vector sum may be performed using a vector adder unit such as vector adder unit 405, 415, 425, 435, 445, 455, 465, or 475 of FIG. 4. In the example shown, the result of the vector operations performed is a single result sum and a channel convolution result data element of a channel convolution result matrix for each portion of the activation data input matrix partition. In some embodiments, each result sum is a dot product computed using a weight input vector and data input vector. The result sum may be outputted as one element of a vector result and transmitted to an output unit such as output unit 151 of FIG. 1 and/or output unit 500 of FIG. 5. For example, a channel convolution result data element is determined for each channel of the portion and outputted as a result vector. For a partition with four portions, four result vectors may be outputted, each corresponding to a different portion of the partition and each including results covering multiple channels. In some embodiments, the equivalent of the vector computation result shown in computation cells 1105, 1115, 1125, and 1135 is performed using channel convolution processor unit 107 of FIG. 1, channel convolution processor unit 400 of FIG. 4 and/or the processes of FIGS. 6 and/or 7. In some embodiments, the vector computations are performed at step 607 of FIG. 6 and/or step 707 of FIG. 7.

Figure 12:
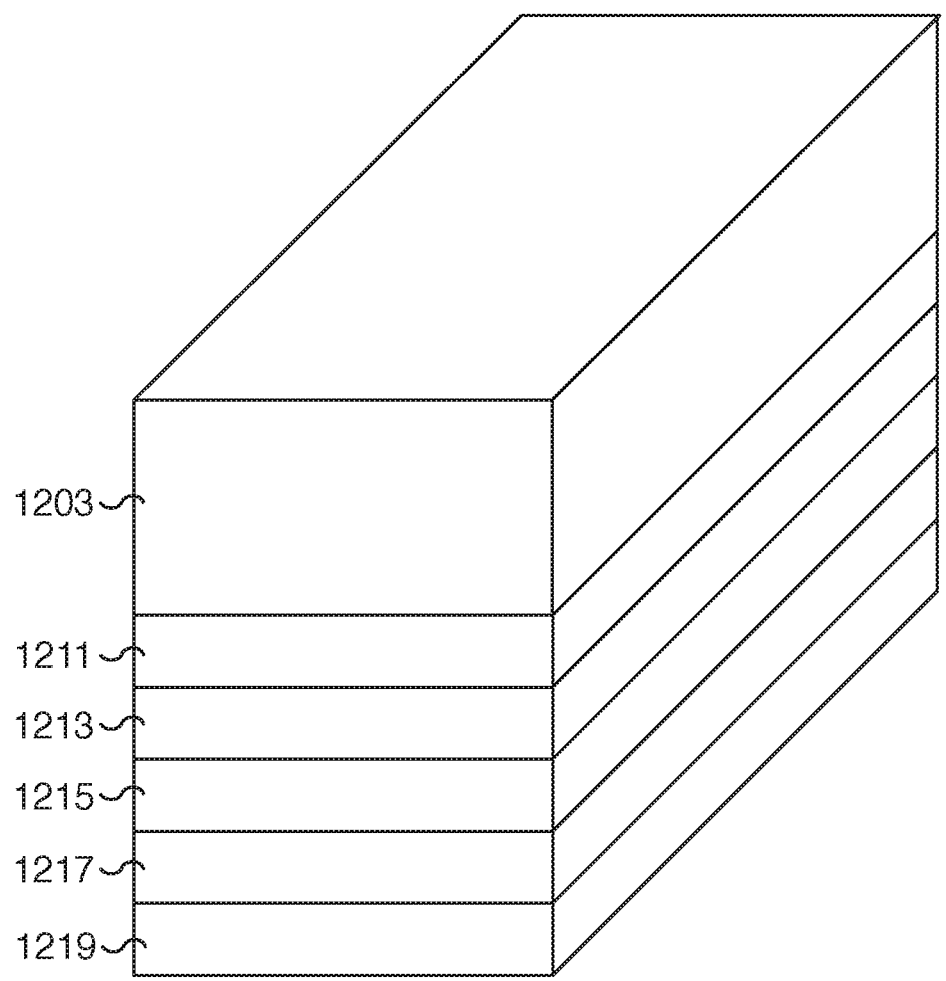
FIG. 12 is a diagram illustrating an example vertical traversal of an activation data input matrix using partition increments for performing a convolution operation.

FIG. 12 is a diagram illustrating an example vertical traversal of an activation data input matrix using partition increments for performing a convolution operation. In the example shown, partition 1203 is a three-dimensional sub-matrix of an activation data input matrix assigned to a processing element. Partition 1203 corresponds to the initial set of data input processed by a channel convolution processor unit and includes multiple three-dimensional sub-matrix portions that are compatible with corresponding weight matrices. In some embodiments, the portions of partition 1203 are identified at step 701 of FIG. 7 and partition 1203 is prepared and loaded to a channel convolution processor unit at step 703 of FIG. 7. Once the channel convolution result data elements associated with partition 1203 have been determined, additional partitions of the activation data input matrix are selected and processed by loading incremental data input. In the example of FIG. 12, the incremental data input is processed by traversing the activation data input matrix vertically by partitions. Horizontal slices 1211, 1213, 1215, 1217, and 1219 are incremental data input processed for each successive partition iteration (or cycle) in the process of determining channel convolution results. In various embodiments, the process used to determine channel convolution results is the process of FIGS. 6 and/or 7. For example, each of horizontal slices 1211, 1213, 1215, 1217, and 1219 is loaded as a new row of data elements during a different iteration at step 713 of FIG. 7. Additional horizontal slices are loaded and processed as part of new partitions until no more additional data input exists from the activation data input matrix partitions assigned to the processing element. In some embodiments, the width and height of partition 1203 is 6×3 and the corresponding width and height of each horizontal slice 1211, 1213, 1215, 1217, and 1219 is 6×1. Partition 1203 and horizontal slices 1211, 1213, 1215, 1217, and 1219 have the same depth in the channel dimension, which may be a cache-line or multiple of a cache-line. In some embodiments, partition 1203 is an initial partition of an activation data input matrix such as partition 803 of FIG. 8A. In some embodiments, slice 1211 is slice 805 of FIG. 8A.

In the example shown, the activation data input matrix is traversed vertically and downward although the upward direction is possible as well. When traversing downward, each newly loaded horizontal slice, such as horizontal slice 1211, 1213, 1215, 1217, and 1219, replaces as input data the top-most row of the previous partition. For example, horizontal slice 1211 replaces the top-most row of data elements of partition 1203. The result of loading each new horizontal slice to replace the top-most row is to slide the relevant partition vertically to iteratively process all partitions of the activation data input matrix assigned to the processing element. In some embodiments, an example of a partition prepared using incremental data input is partition 807 and/or 809 of FIG. 8A.

Although the example of FIG. 12 demonstrates vertical traversal by partitions, an activation data input matrix can be traversed horizontally as well. Further, although the partitions of FIG. 12 are 6×3 sub-matrices, other dimensions are appropriate as well. In various embodiments, when traversing vertically by partition, the height of the selected partition is the same as the height dimension of corresponding weight matrices. Similarly, when traversing horizontally by partition, the width of the selected partition is the same as the width dimension of corresponding weight matrices. In the example of FIG. 12, a vertical stride of 1 is depicted although utilizing a different vertical (or horizontal) stride value can be appropriate as well.

Figure 13:
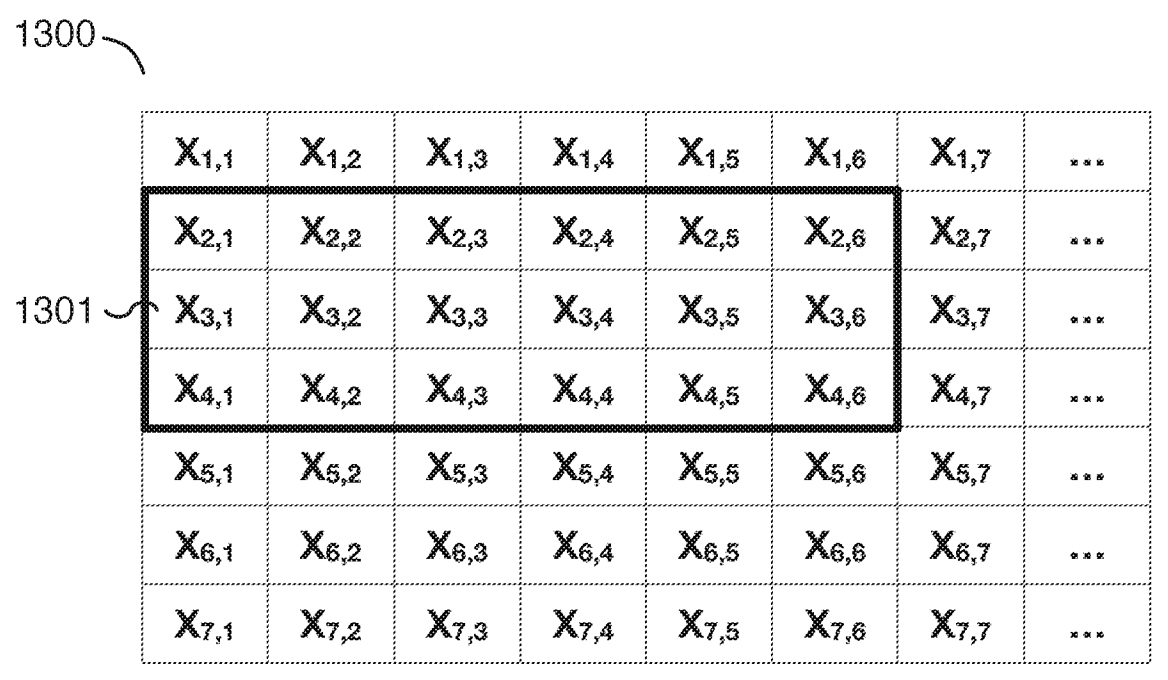

FIG. 13 is a diagram illustrating a single channel of an example activation data input matrix for performing a channel convolution operation traversed vertically using partition increments. Activation data input matrix 1300 is activation data input matrix 1000 of FIGS. 10A-D and partition 1301 is a new partition for processing channel convolution results after channel convolution results are determined for partition 1001 of FIGS. 10A-D. Partition 1301 is selected by traversing activation data input matrix 1300 vertically using partition increments. In some embodiments, partition 1001 of FIGS. 10A-D is processed during the previous partition iteration or cycle prior to processing partition 1301. For example, partition 1001 of FIGS. 10A-D is prepared at step 703 of FIG. 7 and partition 1301 is prepared at step 713 of FIG. 7. Partition 1301 is prepared in part by loading a new horizontal slice or row of data elements corresponding to the data elements $X_{4,1}$, $X_{4,2}$, $X_{4,3}$, $X_{4,4}$, $X_{4,5}$, and $X_{4,6}$. The new data elements replace the top-most row of the previous partition corresponding to data elements $X_{1,1}$, $X_{1,2}$, $X_{1,3}$, $X_{1,4}$, $X_{1,5}$, and $X_{1,6}$. In some embodiments, the new horizontal row is a horizontal slice such as horizontal slice 1211 of FIG. 12.

In various embodiments, partition 1301 is processed with the same weight matrix as the partition processed during the previous iteration. To prepare the corresponding data elements of partition 1301 to be loaded to vector units of a channel convolution processor unit, only the new horizontal slice (or row) of data elements needs to be loaded. For example, only memory reads for the data elements of the new row need to be issued and performed since the data elements from the remaining rows can be reused from previously performed memory reads. In the example shown, the elements corresponding to the top two rows of partition 1301 are already loaded during the previous iteration when partition 1001 of FIGS. 10A-D was prepared. In some embodiments, a data input unit, such as data input unit 103 of FIG. 1 and/or data input unit 200 of FIG. 2, prepares new data input vectors using data elements from a previous partition iteration and the data elements from the new horizontal row. The data elements for the new data input vectors may be selected using a multiplexer or another appropriate technique. In some embodiments, the data elements of the new horizontal slice are loaded into a set of corresponding data input vector registers such as one or more of data input vector registers 201, 203, 205, 207, 209, 211, 221, 223, 225, 227, 229, 231, 241, 243, 245, 247, 249, and 251 of FIG. 2.

FIGS. 14A-D are diagrams illustrating an example of vector computations for performing channel convolution operations on a partition of an activation data input matrix when traversing vertically using partition increments. Each of FIGS. 14A-D illustrate the vector computations for a different one of four portions of an activation data input matrix partition with the same weight input matrix. In the examples of FIGS. 14A-D, weight input vectors 1401, 1411, 1421, and 1431 and data input vectors 1403, 1413, 1423, and 1433 each include nine data elements. Weight input vectors 1401, 1411, 1421, and 1431 correspond to a 3×3 weight matrix. Data input vectors 1403, 1413, 1423, and 1433 each correspond to a 3×3 matrix of a portion of a new partition by traversing vertically down the activation data input matrix. In some embodiments, weight input vectors 1401, 1411, 1421, and 1431 correspond to a linearized version of weight matrix 901 of FIG. 9 and data input vectors 1403, 1413, 1423, and 1433 correspond to linearized versions of different portions of partition 1301 of FIG. 13. As described in more detail above, partition 1301 of FIG. 13 is a new partition selected to be processed after traversing the partitions of an activation data input matrix assigned to a processing element vertically by partition increments. Both newly loaded and reused data elements of partition 1301 of FIG. 13 are reflected in data input vectors 1403, 1413, 1423, and 1433. Since the data elements of the activation data input matrix for partition 1301 of FIG. 13 share the same channel as the partition of the previous iteration, weight input vectors 1401,

1411, 1421, and 1431 are unchanged from the previous iteration and match weight input vectors 1101, 1111, 1121, and 1131 of FIGS. 11A-D.

In some embodiments, computation cells 1405, 1415, 1425, and 1435 illustrate the equivalent vector computations performed by vector units of a channel convolution processor unit with the corresponding weight input vector and data input vector as input vectors. For example, the vector computation result shown in computation cell 1405 is the result determined by multiplying each element of weight input vector 1401 against a corresponding element of data input vector 1403. Similarly, the vector computation result shown in computation cell 1415 is the result determined by multiplying each element of weight input vector 1411 against a corresponding element of data input vector 1413, the vector computation result shown in computation cell 1425 is the result determined by multiplying each element of weight input vector 1421 against a corresponding element of data input vector 1423, and the vector computation result shown in computation cell 1435 is the result determined by multiplying each element of weight input vector 1431 against a corresponding element of data input vector 1433.

Figure 14A:
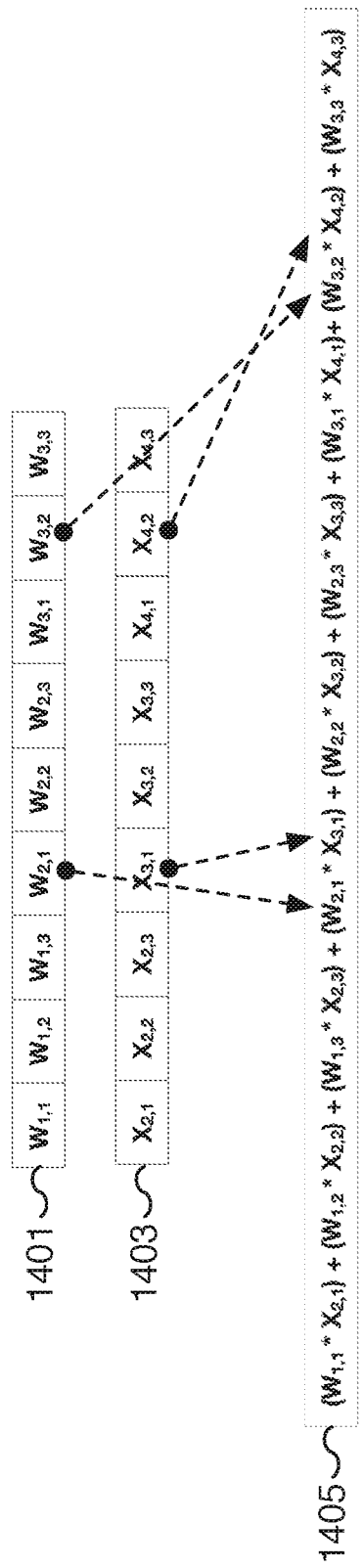
FIGS. 14A-D are diagrams illustrating an example of vector computations for performing channel convolution operations on a partition of an activation data input matrix when traversing vertically using partition increments.
Figure 14B:
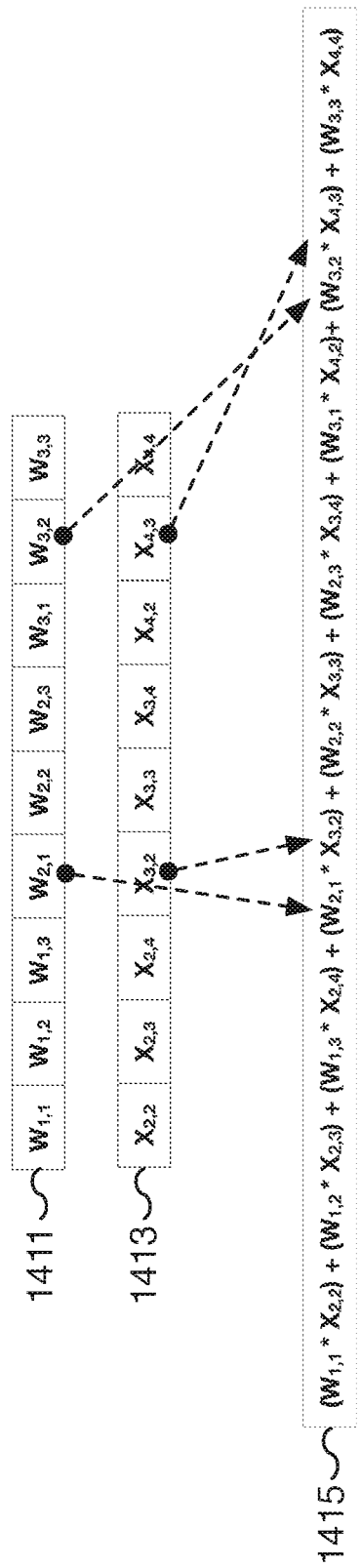
Figure 14C:
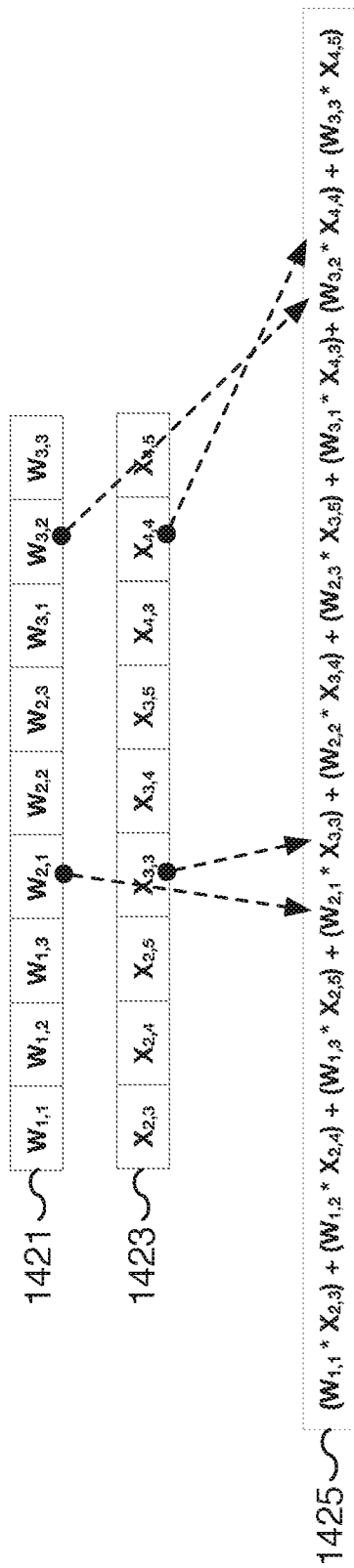
Figure 14D:
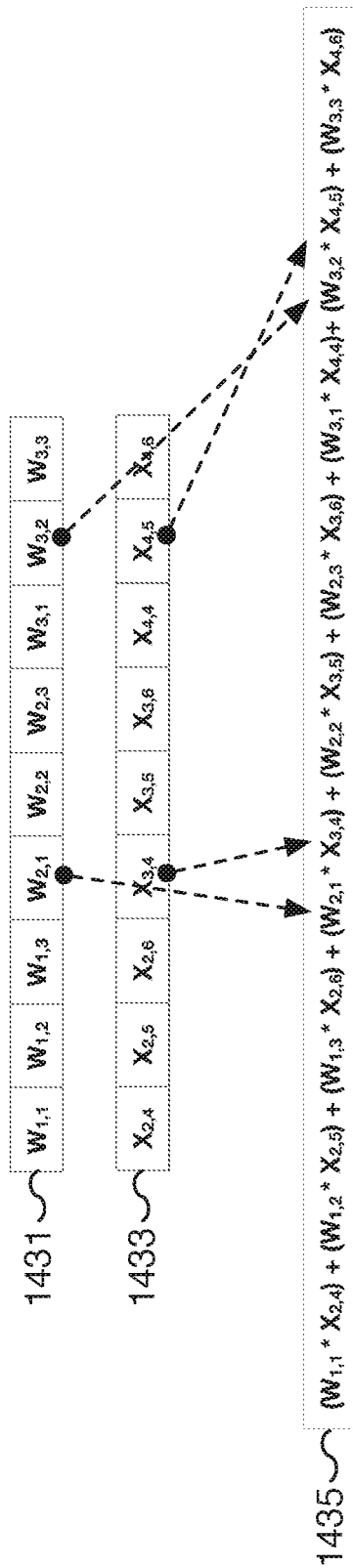

The nine elements from each weight input vector 1401, 1411, 1421, and 1431 are multiplied against the nine elements of each corresponding data input vector 1403, 1413, 1423, and 1433, respectively, to determine nine multiplication results. In the example shown, each of computation cells 1405, 1415, 1425, and 1435 includes the nine multiplication terms corresponding to the nine multiplication results. The arrows in FIGS. 14A-D originating from a weight input vector element or data input vector element and pointing to computation terms of a computation cell call out two of the nine multiplication results and their corresponding operands as examples. In FIG. 14A, the arrows show that weight element $W_{2,1}$ is multiplied with corresponding data element $X_{3,1}$ to determine a multiplication result ($W_{2,1}*X_{3,1}$) and that weight element $W_{3,2}$ is multiplied with corresponding data element $X_{4,2}$ to determine a multiplication result ($W_{3,2}*X_{4,2}$). In FIG. 14D, the arrows show that weight element $W_{2,1}$ is multiplied with corresponding data element $X_{3,4}$ to determine a multiplication result ($W_{2,1}*X_{3,4}$) and that weight element $W_{3,2}$ is multiplied with corresponding data element $X_{4,5}$ to determine a multiplication result ($W_{3,2}*X_{4,5}$). Similar examples are called out by the arrows in FIGS. 14B and 14C.

In some embodiments, the multiplication shown in computation cells 1405, 1415, 1425, and 1435 is performed using a vector multiply unit such as vector multiply unit 403, 413, 423, 433, 443, 453, 463, or 473 of FIG. 4. In some embodiments, the multiplication results are fed as a vector into a vector adder unit to compute the sum of the multiplication results. The vector sum may be performed using a vector adder unit such as vector adder unit 405, 415, 425, 435, 445, 455, 465, or 475 of FIG. 4. In the example shown, the result of the vector operations performed is a single result sum and a channel convolution result data element of a channel convolution result matrix for each portion of the activation data input matrix partition. In some embodiments, each result sum is a dot product computed using a weight input vector and data input vector. The result sum may be outputted as one element of a vector result and transmitted to an output unit such as output unit 151 of FIG. 1 and/or output unit 500 of FIG. 5. For example, a channel convolution result data element is determined for each channel of the portion and outputted as a result vector. For a partition with four portions, four result vectors may be outputted, each corresponding to a different portion of the partition and each including results covering multiple channels. In some embodiments, the equivalent of the vector computation result shown in computation cells 1405, 1415, 1425, and 1435 is performed using channel convolution processor unit 107 of FIG. 1, channel convolution processor unit 400 of FIG. 4, and/or the processes of FIGS. 6 and/or 7. In some embodiments, the vector computations are performed at step 607 of FIG. 6 and/or step 707 of FIG. 7.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor system, comprising:
    a first group of registers configured to store data elements of a plurality of channels of a portion of a convolution data matrix, wherein each register of the first group of registers stores at least one data element from each of the plurality of channels;
    a second group of registers configured to store data elements of a plurality of convolution weight matrices including a separate convolution weight matrix for each of the plurality of channels, wherein each register of the second group of registers stores at least one data element from each of the plurality of convolution weight matrices; and
    a hardware processor unit configured to:
        for each data element in a first portion of the first group of registers, multiply the data element in the first portion with a corresponding data element in the second group of registers to determine a corresponding multiplication result in first multiplication results, wherein the first portion corresponds to a first sub matrix of the convolution data matrix;
        for each data element in a second portion of the first group of registers, multiply the data element in the second portion with a corresponding data element in the second group of registers to determine a corresponding multiplication result in second multiplication results, wherein the second portion corresponds to a second sub matrix of the convolution data matrix that is different from the first sub matrix but the second sub matrix at least in part overlaps with the first sub matrix of the convolution data matrix; and
        for each specific channel of the plurality of channels, sum together ones of the first multiplication results corresponding to the specific channel to determine one corresponding channel convolution result data element in a corresponding channel convolution result matrix and sum together ones of the second multiplication results corresponding to the specific channel to determine another one corresponding channel convolution result data element in the corresponding channel convolution result matrix.

2. The system of claim 1, wherein a total count of the stored data elements of the first group of registers is greater than a total count of the stored data elements of the second group of registers.

3. The system of claim 1, wherein the hardware processor unit is configured to determine the first multiplication results and the second multiplication results at least in part concurrently.

4. The system of claim 1, wherein the hardware processor unit is configured to determine channel convolution result data elements associated with the first portion of the first group of registers and the second portion of the first group of registers at least in part concurrently.

5. The system of claim 1, wherein the data elements in the first portion of the first group of registers match at least two-thirds of the data elements in the second portion of the first group of registers.

6. The system of claim 1, wherein the first portion of the first group of registers overlaps with the second portion of the first group of registers and the second portion of the first group of registers includes a group of data elements that are different from the data elements in the first portion of the first group of registers.

7. The system of claim 1, wherein the hardware processor unit is configured to receive a plurality of data elements of the first group of registers corresponding to a same channel of the convolution data matrix and a plurality of corresponding data elements of the second group of registers corresponding to the separate convolution weight matrix for the same channel of the convolution data matrix.

8. The system of claim 7, wherein the hardware processor unit includes a plurality of vector units, each vector unit of the plurality of vector units includes a different vector multiply unit and a different vector adder unit.

9. The system of claim 8, wherein each of the different vector adder units includes a different adder tree.

10. The system of claim 1, wherein the convolution data matrix is a three-dimensional machine learning data matrix.

11. The system of claim 1, wherein the hardware processor unit is further configured to: process the data elements stored in the first group of registers by channel into a plurality of data input vectors, wherein each of the plurality of data input vectors includes data elements corresponding to a two-dimensional sub-matrix of the convolution data matrix.

12. The system of claim 1, wherein the hardware processor unit is further configured to: process the data elements stored in the second group of registers into a plurality of weight input vectors, wherein each of the plurality of weight input vectors includes data elements corresponding to one of the plurality of convolution weight matrices.

13. The system of claim 1, wherein each of the plurality of convolution weight matrices is a 3×3, 5×5, 7×7, 9×9, or 11×11 matrix.

14. The system of claim 1, wherein the data elements stored in the first group of registers are 4-bit, 8-bit, 2-byte, or 4-byte elements.

15. The system of claim 1, wherein a total count of the stored data elements of each of the first group of registers is a multiple of a cache line size.

16. A method, comprising:
storing at a hardware processing element in a first group of registers data elements of a plurality of channels of a first portion of a convolution data matrix, wherein each register of the first group of registers stores at least one data element from each of the plurality of channels;
storing at the hardware processing element in a second group of registers data elements of a subset of a set of convolution weight matrices including a separate convolution weight matrix for each of the plurality of channels, wherein each register of the second group of registers stores at least one data element from each of the subset of the set of convolution weight matrices;
for each data element in a first portion of the first group of registers, multiplying the data element in the first portion with a corresponding data element in the second group of registers to determine a corresponding multiplication result in first multiplication results, wherein the first portion corresponds to a first sub matrix of the convolution data matrix;
for each data element in a second portion of the first group of registers, multiplying the data element in the second portion with a corresponding data element in the second group of registers to determine a corresponding multiplication result in second multiplication results, wherein the second portion corresponds to a second sub matrix of the convolution data matrix that is different from the first sub matrix but the second sub matrix at least in part overlaps with the first sub matrix of the convolution data matrix;
for each specific channel of the plurality of channels, summing together ones of the first multiplication results corresponding to the specific channel to determine one corresponding channel convolution result data element in a corresponding channel convolution result matrix; and
for each specific channel of the plurality of channels, summing together ones of the second multiplication results corresponding to the specific channel to determine another one corresponding channel convolution result data element in the corresponding channel convolution result matrix.

17. The method of claim 16, further comprising:
saving in the first group of registers data elements that overlap between the first portion of the convolution data matrix and a second portion of the convolution data matrix; and
storing in the first group of registers a three-dimensional slice of data elements of a plurality of channels of the second portion of the convolution data matrix, wherein the data elements of the three-dimensional slice are different from the data elements of the first portion of the convolution data matrix.

18. The method of claim 17, wherein the three-dimensional slice of data elements is a vertical column or a horizontal row of the second portion of the convolution data matrix.

19. The method of claim 16, wherein a total count of the stored data elements of each of the first group of registers is a multiple of a cache line size, and wherein the total count of the stored data elements of the first group of registers is greater than a total count of the stored data elements of the second group of registers.

20. A method, comprising:
receiving a convolution operation instruction specifying a convolution data matrix and a set of convolution weight matrices;
assigning a different portion of the convolution data matrix to each of a plurality of processing elements;
transmitting a plurality of data elements corresponding to the different assigned portion of the convolution data matrix to each of the plurality of processing elements;
broadcasting to each of the plurality of processing elements assigned a same channel of the convolution data matrix a same subset of the set of convolution weight matrices;
for each of the plurality of processing elements:
storing at a hardware processing element in a first group of registers data elements of a plurality of channels of a first portion of the convolution data matrix, wherein each register of the first group of registers stores at least one data element from each of the plurality of channels;
storing at the hardware processing element in a second group of registers data elements of a subset of the set of convolution weight matrices including a separate convolution weight matrix for each of the plurality of channels, wherein each register of the second group of registers stores at least one data element from each of the subset of the set of convolution weight matrices;

for each data element in a first portion of the first group of registers, multiplying the data element in the first portion with a corresponding data element in the second group of registers to determine a corresponding multiplication result in first multiplication results, wherein the first portion corresponds to a first sub matrix of the convolution data matrix;

for each data element in a second portion of the first group of registers, multiplying the data element in the second portion with a corresponding data element in the second group of registers to determine a corresponding multiplication result in second multiplication results, wherein the second portion corresponds to a second sub matrix of the convolution data matrix that is different from the first sub matrix but the second sub matrix at least in part overlaps with the first sub matrix of the convolution data matrix;

for each specific channel of the plurality of channels, summing together ones of the first multiplication results corresponding to the specific channel to determine one corresponding channel convolution result data element in a corresponding channel convolution result matrix; and for each specific channel of the plurality of channels, summing together ones of the second multiplication results corresponding to the specific channel to determine another one corresponding channel convolution result data element in the corresponding channel convolution result matrix;

receiving from the plurality of processing elements channel convolution result data elements of the corresponding channel convolution result matrix determined using hardware channel convolution processor units of the plurality of processing elements; and storing the corresponding channel convolution result matrix to a memory location, wherein the convolution data matrix and the corresponding channel convolution result matrix are stored using a channel-first layout format.

* * * * *